United States Patent
Tang et al.

(10) Patent No.: US 11,937,116 B2
(45) Date of Patent: *Mar. 19, 2024

(54) TECHNIQUES FOR GAP-BASED FEEDBACK MEASUREMENT IN NEW RADIO WIRELESS CELLULAR NETWORK

(71) Applicant: Apple Inc., Cupertino, CA (US)

(72) Inventors: Yang Tang, San Jose, CA (US); Jie Cui, Santa Clara, CA (US); Rui Huang, Beijing (CN); Hua Li, Beijing (CN); Yuhan Zhou, La Jolla, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,649

(22) Filed: Dec. 28, 2022

(65) Prior Publication Data

US 2023/0156507 A1 May 18, 2023

Related U.S. Application Data

(63) Continuation of application No. 17/267,419, filed as application No. PCT/US2019/045706 on Aug. 8, 2019, now Pat. No. 11,570,649.

(Continued)

(51) Int. Cl.
*H04B 17/24* (2015.01)
*H04B 17/309* (2015.01)
(Continued)

(52) U.S. Cl.
CPC ............ *H04W 24/10* (2013.01); *H04B 17/24* (2015.01); *H04B 17/309* (2015.01);
(Continued)

(58) Field of Classification Search
CPC ... H04B 7/02–12; H04B 17/0082–3913; H04J 11/0023–0093;
(Continued)

(56) References Cited

U.S. PATENT DOCUMENTS 11,570,649 B2 * 1/2023 Tang ..................... H04W 24/10
2010/0034126 A1 2/2010 Kitazoe et al.
(Continued)

FOREIGN PATENT DOCUMENTS

WO WO 2009/157729 A1 12/2009
WO WO 2016/164087 A1 10/2016
(Continued)

OTHER PUBLICATIONS

International Search Report and Written Opinion of the International Searching Authority directed to related International Patent Application No. PCT/US2019/045706, dated Nov. 28, 2019; 11 pages.

(Continued)

*Primary Examiner* — Timothy J Weidner
(74) *Attorney, Agent, or Firm* — Sterne, Kessler, Goldstein & Fox P.L.L.C.

(57) ABSTRACT

Embodiments of the present disclosure provide techniques for determining synchronization signal (SS)/physical broadcast channel (PBCH) block (SSB)-based measurement timing configuration (SMTC) for measurement objects for which a user equipment is to measure feedback information in one or more measurement gaps. Other embodiments may be described and claimed.

20 Claims, 9 Drawing Sheets

Related U.S. Application Data

(60) Provisional application No. 62/717,690, filed on Aug. 10, 2018.

(51) Int. Cl.
| | |
|---|---|
| *H04B 17/382* | (2015.01) |
| *H04W 24/10* | (2009.01) |
| *H04W 36/00* | (2009.01) |
| *H04W 56/00* | (2009.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ...... *H04B 17/382* (2015.01); *H04W 36/0094* (2013.01); *H04W 56/001* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC .. H04J 2011/0003–0096; H04L 5/0001–0098; H04W 8/22–245; H04W 24/02–10; H04W 28/02–26; H04W 36/0005–385; H04W 48/02–20; H04W 56/0005–0095; H04W 72/02–569; H04W 74/002–0891; H04W 76/10–50; H04W 84/02–16; H04W 88/02–12; H04W 92/02; H04W 92/04; H04W 92/10

See application file for complete search history.

(56) References Cited

U.S. PATENT DOCUMENTS

| | | |
|---|---|---|
| 2019/0306734 A1 | 10/2019 | Huang et al. |
| 2020/0396704 A1 | 12/2020 | Dalsgaard et al. |
| 2021/0014752 A1 | 1/2021 | Axmon et al. |
| 2021/0297970 A1 | 9/2021 | Tang et al. |

FOREIGN PATENT DOCUMENTS

| | | |
|---|---|---|
| WO | WO 2018/089879 A1 | 5/2018 |
| WO | WO 2018/144781 A1 | 8/2018 |

OTHER PUBLICATIONS

Ericsson, "Analysis of collisions between type A/B/C intra-measurement, measurement gap and RLM," R4-1803788, 3GPP TSG-RAN WG4 Meeting #86bis, Melbourne, Australia, Apr. 6, 2018.

Huawei et al., "Discussion on SSB based RLM requirements," R4-1807286, 3GPP TSG-RAN WG4 Meeting #87, Busan, Korea, May 14, 2018.

Huawei et al., "Discussion on the misalignment of SMTC for type A/B measurement and MG," R4-1807319, 3GPP TSG-RAN WG4 Meeting #87, Busan, Korea, May 14, 2018.

Ericsson, "Comparison of alternatives for requirements for multiple measurement objects," R4-1808712, 3GPP TSG-RAN WG4 Meeting #AH1807, Montreal, Canada, Jun. 25, 2018.

\* cited by examiner

TECHNIQUES FOR GAP-BASED FEEDBACK MEASUREMENT IN NEW RADIO WIRELESS CELLULAR NETWORK

CROSS REFERENCE TO RELATED APPLICATIONS

This application is a continuation of U.S. application Ser. No. 17/267,419, filed on Feb. 9, 2021, which is a U.S. National Phase of International Application No. PCT/US2019/045706, filed Aug. 8, 2019, which claims priority to U.S. Provisional Patent Application No. 62/717,690, filed Aug. 10, 2018, all of which are incorporated herein by reference in their entireties.

FIELD

Embodiments of the present invention relate generally to the technical field of wireless communications.

BACKGROUND

In New Radio (NR) wireless communication networks, a user equipment (UE) measures feedback information on measurement objects (e.g., cells) and provides the feedback information to the network. Each measurement object may have a different synchronization signal (SS)/physical broadcast channel (PBCH) block (SSB)-based measurement timing configuration (SMTC), including a different SMTC periodicity. Furthermore, the different measurement objects may or may not be fully overlapped with a measurement gap of the UE or an associated NR frequency range.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Figure 1:
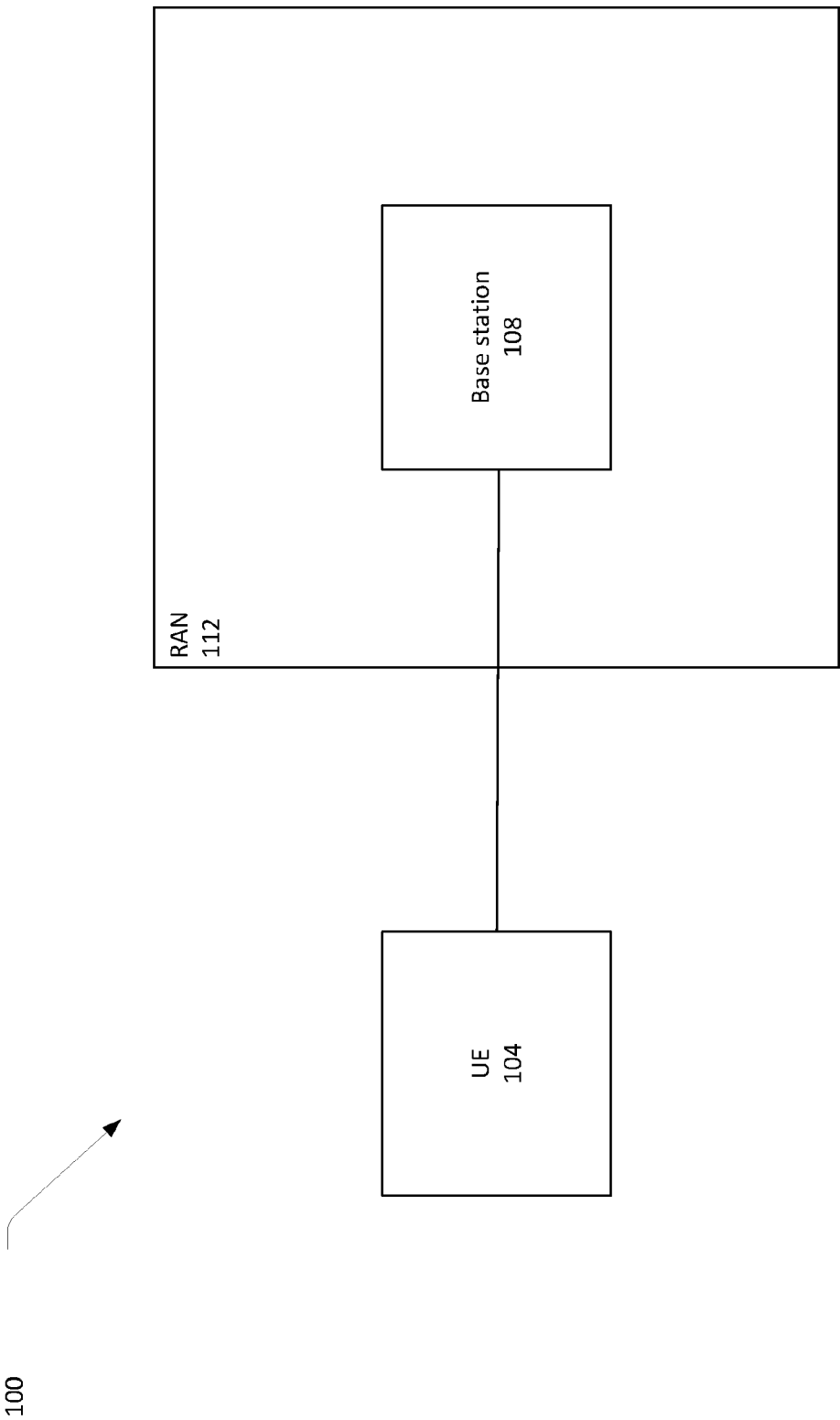
FIG. 1 illustrates a network in accordance with some embodiments.

FIG. 1 illustrates a network 100 in accordance with some embodiments. In general, the components shown in the network 100 may be similar to, and substantially interchangeable with, like-named components in other figures described herein. The network 100 may include a UE 104 to communicate with a base station 108 of a radio access network (RAN) 112 using one or more radio access technologies.

The base station 108 may be referred to as a base station ("BS"), NodeB, evolved NodeB ("eNB"), next generation NodeB ("gNB"), RAN node, Road Side Unit ("RSU"), and so forth, and can comprise a ground station (e.g., a terrestrial access point) or a satellite station providing coverage within a geographic area (for example, a cell). An RSU may refer to any transportation infrastructure entity implemented in or by a gNB/eNB/RAN node or a stationary (or relatively stationary) UE, where an RSU implemented in or by a UE may be referred to as a "UE-type RSU," and an RSU implemented in or by an gNB may be referred to as a "gNB-type RSU."

In some embodiments, the RAN may be a next generation ("NG") radio access network ("RAN"), in which case the base station 108 may be a gNB that communicates with the UE 104 using a new radio ("NR") access technology. Accordingly, the RAN 112 may be a NR wireless cellular network.

The UE 104 may be any mobile or non-mobile computing device that is connectable to one or more cellular networks. For example, the UE 104 may be a smartphone, a laptop computer, a desktop computer, a vehicular computer, a smart sensor, etc. In some embodiments, the UE 104 may be an Internet of Things ("IoT") UE, which may include a network access layer designed for low-power IoT applications utilizing short-lived UE connections. An IoT UE can utilize technologies such as machine-to-machine ("M2M") or machine-type communications ("MTC") for exchanging data with an MTC server or device via a public land mobile network ("PLMN"), Proximity-Based Service ("ProSe") or device-to-device ("D2D") communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (for example, keep-alive messages, status updates, etc.) to facilitate the connections of the IoT network.

In accordance with some embodiments, the UE 104 can be configured to communicate using Orthogonal Frequency-Division Multiplexing ("OFDM") communication signals with the base station 108 over a multicarrier communication channel in accordance with various communication techniques, such as, but not limited to, an Orthogonal Frequency-Division Multiple Access ("OFDMA") communication technique (for example, for downlink communications) or a Single Carrier Frequency Division Multiple Access ("SC-FDMA") communication technique (for example, for uplink or sidelink communications), although the scope of the embodiments is not limited in this respect. The OFDM signals can comprise a plurality of orthogonal subcarriers.

In some embodiments, a downlink resource grid can be used for downlink transmissions from the base station 108 to the UE 104, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical channels that are conveyed using such resource blocks.

In various embodiments, the UE 104 may be configured with a measurement gap. During the measurement gap, the UE 104 may not be expected to transmit or receive signals from the gNB 108 on a serving cell. Instead, the UE 104 may measure feedback information on one or more measurement objects (e.g., other cells) during the measurement gap. In some embodiments, the feedback information may include one or more of a received signal received power (RSRP), a received signal received quality (RSRQ), or a signal to interference plus noise ratio (SINR). The feedback information may be measured on one or more reference signals transmitted by the respective measurement object. For example, in some embodiments, the reference signal may include a synchronization signal (SS)/physical broadcast channel (PBCH) block (SSB). In such embodiments, the feedback information may include, for example, an SSB-RSRP, an SSB-RSRQ, and/or an SSB-SINR.

In various embodiments, the UE 104 may transmit the feedback information to the gNB 108. The gNB 108 may use the feedback information, for example, to determine whether to handover the UE 104 to a new serving cell.

The UE 104 may receive a measurement gap configuration (e.g., from the gNB 108) that indicates the time/frequency resources to be used for measurement gap instances. For example, the measurement gap configuration may include a periodicity and duration of the measurement gap. The measurement gap may be per-UE or per-frequency range (FR) (e.g., separate measurement gaps for NR Frequency Range 1 (FR1) and NR Frequency Range 2 (FR2).

In various embodiments, the gNB 108 may send configuration information to the UE 104 to indicate a SSB-based measurement timing configuration (SMTC) of the respective measurement objects for which the UE 104 is to measure feedback information. The SMTC may include, for example, a periodicity and/or duration of SSB instances (also referred to as SMTC instances). In some embodiments, the SMTC may be configured by a measObjectNR information element transmitted by the gNB 108 to the UE 104 (e.g., in downlink control information (DCI)).

The SMTC for a measurement object may be fully overlapped, partially overlapped, or fully non-overlapped with the measurement gap configuration. By fully overlapped, it is meant that an SSB is transmitted within each measurement gap instance of the measurement gap configuration. For example, the periodicity of the SMTC may be the same as the periodicity of the measurement gap configuration. By partially overlapped, it is meant that some, but not all of the SSBs transmitted according to the SMTC occur within measurement gap instances of the measurement gap configuration. By fully non-overlapped, it is meant that none of the SSBs transmitted according to the SMTC occur within the measurement gap instances of the measurement gap configuration.

In various embodiments, the gNB 108 may restrict the relationship between the SMTC and the measurement gap configuration for the measurement objects for which the UE 104 is to measure feedback information. For example, in a first scenario, all measurement objects for which the UE 104 is to measure feedback information may have an SMTC that is fully overlapped with the measurement gap configuration (e.g., all of the measurement objects may have the same SMTC). In some such embodiments, the gNB 108 may further configure additional measurement objects that have an SMTC that is fully non-overlapped with the measurement gap configuration. Accordingly, if the UE 104 is to measure feedback information on these additional measurement objects, the UE 104 must do so outside of the measurement gaps.

Alternatively, in a second scenario, the gNB 108 may define two sets/groups of one or more measurement objects, with the measurement objects in each set having the same SMTC. For example, a first set of measurement object may have a first SMTC that is fully (or partially) overlapped with the measurement gap configuration, and a second set of measurement objects may have a second SMTC that is partially overlapped with the measurement gap configuration. The second SMTC may be different from the first SMTC. The first and second measurement objects may combine to include all of the measurement objects for which the UE is to provide feedback information based on the measurement gap configuration.

In a third scenario, all measurement objects may be grouped by SMTC, so that the measurement objects within a group have the same SMTC. For a given group, at most one other group of measurement object may be allowed to have an SMTC that partially overlaps with the SMTC for the given group.

As discussed above, in some embodiments, per-FR measurement gap configurations may be used (e.g., a first measurement gap configuration for FR1 frequency carriers and a second measurement gap configuration for FR2 frequency carriers). In these embodiments, the techniques described above may be applied separately for each frequency range.

In various embodiments, the restrictions on SMTCs described herein may facilitate UE implementation of the feedback mechanisms, while also allowing some flexibility for SMTC determination by the network. Additionally, or alternatively, the restrictions on SMTCs may facilitate determination of an expected delay (e.g., delay budget for providing the feedback information.

For example, the gNB 108 and/or UE 104 may determine an expected delay (e.g., delay budget) for providing the feedback information on the measurement objects. The expected delay may correspond to, for example, a time period between when the feedback information is triggered and when the gNB 108 receives the feedback information (or when the UE 104 transmits the feedback information). The expected delay may be determined, for example, based on the type of SMTC restrictions in place (as described herein), the SMTC(s) used, the measurement gap configuration, a quantity of the measurement objects, and/or whether the measurement gap configuration is per-UE or per-FR.

The gNB 108 may use the determined expected delay, for example, to make handover decisions for the UE 104 and/or determine a value for one or more timers that are used for handover decisions. The UE 104 may use the determined expected delay, for example, to determine a resource coordination strategy (e.g., timing/sequence of measurements for the different measurement objects).

In some embodiments, the expected delay may include an identification delay to identify the respective measurement object and a measurement delay to measure the feedback information for the respective measurement object. Some example equations for determining the expected delay (e.g., the identification delay and/or measurement delay) under the various scenarios described above and elsewhere herein are provided below. It will be apparent that variations on these equations may be made without departing from the scope of this disclosure.

For example, in the first scenario described above (e.g., all measurement objects are fully overlapped with the measurement gap configuration) and with a per-UE measurement gap, the identification delay may be determined according to:

$$\tilde{T}_{Identify\_Inter\_perUEgap,group_i} =$$
$$K_{Inter-freq,GS} * \left( N_{FR1,i} \times M_{Identify_{Inter-freq,FR1}} \times \max(SMTC_i, MGRP) + N_{FR2,i} \times M_{Identify_{Inter-freq,FR2}} \times \max(SMTC_i, MGRP) \right)$$

wherein:
- $\tilde{T}_{Indentify\_Inter\_perUEgap,group_i}$ is the identification delay;
- $K_{Inter-freq,GS}$ is a scaling factor;
- $SMTC_i$ is an SMTC periodicity of the group of measurement objects;
- MGRP is a measurement gap repetition period of the measurement gap configuration;
- $N_{FR1,i}$ is a number inter-frequency new radio (NR) frequency range 1 (FR1) carriers in the plurality of measurement objects;
- $N_{FR2}$ is a number inter-frequency NR frequency range 2 (FR2) carriers in the plurality of measurement objects;
- $M_{Identify_{inter-freq,FR1}}$ is a number of SMTC occasions that are used to identify a cell on one of the FR1 inter-frequency carriers;
- $M_{Identify_{inter-freq,FR2}}$ is a number of SSBs that are used to identify a cell on one of the FR2 inter-frequency carriers.

Additionally, or alternatively, the measurement delay may be determined according to:

$$\tilde{T}_{measurement\_Inter\_perUEgap,group_i} =$$
$$K_{Inter-freq,GS} * \left( N_{FR1,i} \times M_{measurement\_Inter-freq,FR1} \times \max(SMTC_i, MGRP) + N_{FR2,i} \times M_{measurement\_Inter-freq,FR2} \times \max(SMTC_i, MGRP) \right)$$

wherein:
- $\tilde{T}_{measurement\_Inter\_perUEgap,group_i}$ is the measurement delay;
- $M_{measurement\_Inter-freq, FR1}$ is a number of SMTC occasions that are used to measure a cell on one of the FR1 inter-frequency carriers; and
- $M_{measurement\_Inter-freq, FR2}$ is a number of SSBs that are used to measure a cell on one of the FR2 inter-frequency carriers.

For the first scenario, if per-FR measurement gaps are used, the identification delay for the measurement objects in FR1 may be determined according to:

$$\tilde{T}_{Indentify\_Inter\_perUEgap,FR1} = K_{Inter-freq,GS} \times N_{FR1} \times M_{Identify_{Inter-freq,FR1}} \times SMTC_{FR1}$$

Similarly, the identification delay for the measurement objects in FR2 may be determined according to:

$$\tilde{T}_{Indentify\_Inter\_perUEgap,FR2} = K_{Inter-freq,GS} \times N_{FR2} \times M_{Identify_{Inter-freq,FR2}} \times SMTC_{FR2}$$

As discussed above, in a second example scenario, a first set of measurement objects may be configured with a first SMTC and a second set of measurement objects may be configured with a second SMTC. The first SMTC may be fully or partially overlapped with the measurement gap configuration, and the second SMTC may be partially overlapped with the measurement gap configuration. For a per-UE measurement gap configuration, the expected delay for feedback information for the individual first or second set of measurement objects may be determined according to:

$$\tilde{T}_{Identify_{Inter_{per}}-UE-gap} =$$
$$K_{Inter-freq,GS} \times \left( \sum_{i=1}^{N_{freq,FR1}} \left( M_{Identify\_Inter-freq,FR1} \cdot \text{Max}(SMTC_i, MGRP) \right) + \sum_{j=1}^{N_{freq,FR2}} \left( M_{Identify\_Inter-freq,FR2} \cdot \text{Max}(SMTC_j, MGRP) \right) \right) \text{ms}$$

$$T_{Measurement_{Inter_{per}}-UE-gap} =$$
$$K_{Inter-freq,GS} \times \left( \sum_{i=1}^{N_{freq,FR1}} \left( M_{Measurement\_Inter-freq,FR1} \cdot \text{Max}(SMTC_i, MGRP) \right) + \sum_{j=1}^{N_{freq,FR2}} \left( M_{Measurement\_Inter-freq,FR2} \cdot \text{Max}(SMTC_j, MGRP) \right) \right) \text{ms}$$

wherein:
- $\tilde{T}_{Indentify\_Inter\_perUEgap}$ is an expected identification delay;
- $\tilde{T}_{measurement\_Inter\_perUEgap}$ is an expected measurement delay;
- $K_{Inter-freq,GS}$ is a scaling factor;
- $SMTC_i$ is an SMTC periodicity of the respective set of measurement objects;
- MGRP is a measurement gap repetition period of the measurement gap configuration;
- $N_{FR1,i}$ is a number of inter-frequency new radio (NR) frequency range 1 (FR1) carriers in the set of measurement objects;
- $N_{FR2}$ is a number of inter-frequency NR frequency range 2 (FR2) carriers in the set of measurement objects;
- $M_{Identify_{inter-freq,FR1}}$ is a number of SMTC occasions that are used to identify a cell on one of the FR1 inter-frequency carriers;
- $M_{Identify_{inter-freq,FR2}}$ is a number of SSBs that are used to identify a cell on one of the FR2 inter-frequency carriers;
- $M_{measurement\_Inter-freq, FR1}$ is a number of SMTC occasions that are used to measure a cell on one of the FR1 inter-frequency carriers; and $M_{measurement\_Inter-freq,\ FR2}$ is a number of SSBs that are used to measure a cell on one of the FR2 inter-frequency carriers.

For a per-FR measurement gap configurations in the second scenario, the expected delay for the measurement objects of FR1 may be determined according to:

$$T_{IdentifyInter_{per}}-FG,FR1 =$$

$$K_{Inter-freq,FR1,GS} \times \left( \sum_{i=1}^{N_{freq,FR1}} \left( M_{Inter-freq,FR1} \cdot \text{Max}(SMTC_i, MGRP) \right) \right) \text{ ms}$$

$$T_{measurementInter_{per}}-FG,FR1 = K_{Inter-freq,FR1,GS} \times$$

$$\left( \sum_{i=1}^{N_{freq,FR1}} \left( M_{measurement\_Inter-freq,FR1} \cdot \text{Max}(SMTC_i, MGRP) \right) \right) \text{ ms}$$

Similarly, the expected delay for the measurement objects of FR2 may be determined according to:

$$T_{IdentifyInter_{per}}-FG,FR2 =$$

$$K_{Inter-freq,FR2,GS} \times \left( \sum_{i=1}^{N_{freq,FR2}} \left( M_{Inter-freq,FR2} \cdot \text{Max}(SMTC_i, MGRP) \right) \right) \text{ ms}$$

$$T_{measurementInter_{per}}-FG,FR2 = K_{Inter-freq,FR2,GS} \times$$

$$\left( \sum_{i=1}^{N_{freq,FR2}} \left( M_{measurement\_Inter-freq,FR2} \cdot \text{Max}(SMTC_i, MGRP) \right) \right) \text{ ms}$$

As discussed above, a third scenario may include grouping all measurement objects by SMTC, so that the measurement objects within a group have the same SMTC. For a given group, at most one other group of measurement object may be allowed to have an SMTC that partially overlaps with the SMTC for the given group. In some embodiments, for a first set (e.g. set i) under the third scenario using per-UE measurement gap, in which a second set (e.g., set j) is partially overlapped, the expected delay may be determined according to:

$$\tilde{T}_{IdentifyInter_{PerUEgap},group_i} =$$

$$K_{Inter-freq,GS} \times \left( M_{IdentifyInter-freq,FR1} \times (N_{FR1,i} \times \text{max}(SMTC_i, MGRP) + N_{FR1,partial} \times \text{max}(SMTC_{i,partial}, MGRP)) + M_{IdentifyInter-freq,FR2} \times \right.$$

$$\left. (N_{FR2,i} \times \text{max}(SMTC_i, MGRP) + N_{FR2,i,partial} \times \text{max}(SMTC_{i,partial}, MGRP)) \right)$$

wherein:

$$\tilde{T}_{IdentifyInter_{perUEgap},group_i}$$

is an expected identification delay for the measurement objects of the first set;

$K_{inter-freq,GS}$ is a scaling factor $SMTC_i$ is an SMTC periodicity of the first SMTC;

$SMTC_{i,partial}$ is an SMTC periodicity of the second SMTC;

$N_{FR1,i}$ is a number inter-frequency NR FR1 carriers in the first set of measurement objects;

$N_{FR2,i}$ is a number inter-frequency NR FR2 carriers in the second set of measurement objects;

$N_{FR1,i,partial}$ is a number inter-frequency NR FR1 carriers in the second set of measurement objects;

$N_{FR2,i,partial}$ is a number inter-frequency NR FR2 carriers in the second set of measurement objects;

$M_{Identify\_Inter-freq,\ FR1}$ is a number of SMTC occasions which is used to identify a cell on a FR1 inter-frequency carrier; and $M_{Identify\_Inter-freq,\ FR2}$ is a number of SSBs which is used to identify a cell on a FR2 inter-frequency carrier.

For per-FR measurement gap configurations, the expected delay for measurement objects in FR1 may be determined according to:

$$\tilde{T}_{IdentifyInter_{perUEgap},FR1} =$$

$$K_{Inter-freq,GS} \times M_{IdentifyInter-freq,FR1} \times (N_{FR1,i} \times \text{max})SMTC_i, MGRP) + N_{FR1,i,parttial} \times \text{max}(SMTC_{i,partial}, MGRP)$$

Similarly, the expected delay for measurement objects in FR2 may be determined according to:

$$\tilde{T}_{IdentifyInter_{perUEgap},FR2} = K_{Inter-freq,GS} \times M_{IdentifyInter-freq,FR2} \times$$

$$(N_{FR2,i} \times \text{max}(SMTC_i, MGRP) + N_{FR2,i,partial} \times \text{max}(SMTC_{i,partial}, MGRP))$$

Figure 2:
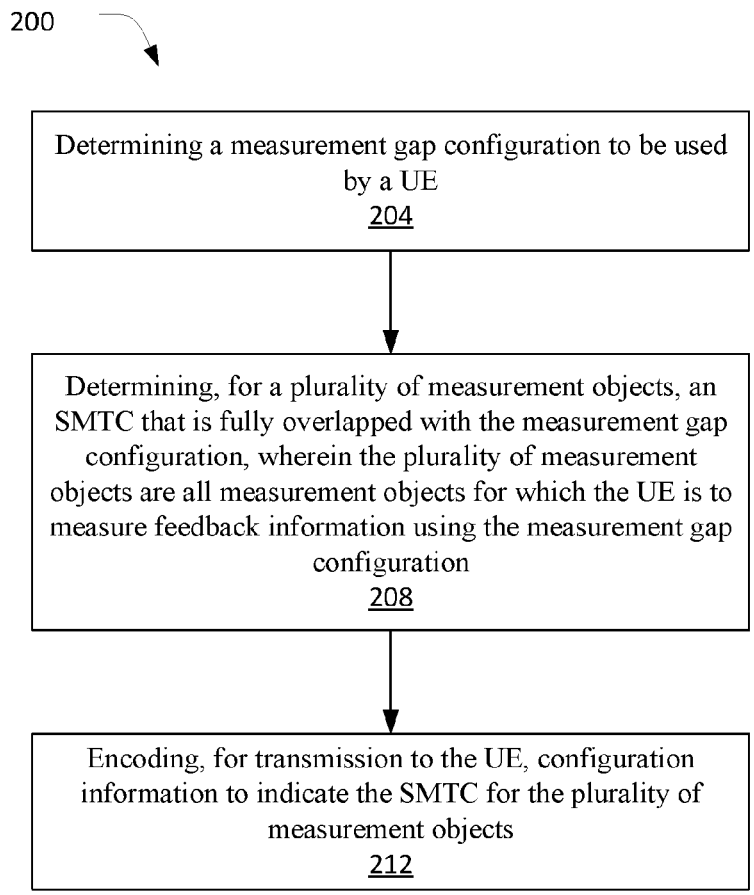
FIG. 2 illustrates an operation flow/algorithmic structure in accordance with some embodiments.

FIG. 2 illustrates an operation flow/algorithmic structure 200 in accordance with some embodiments. The operation flow/algorithmic structure 200 may be performed, in part or in whole, by the base station 108 or components thereof. For example, in some embodiments the operation flow/algorithmic structure 200 may be performed by the baseband circuitry implemented in the base station 108.

The operation flow/algorithmic structure 200 may include, at 204, determining a measurement gap configuration to be used by a UE. In some embodiments, the base station 108 may encode configuration information for transmission to the UE to indicate the measurement gap configuration.

The operation flow/algorithmic structure 200 may further include, at 208, determining, for a plurality of measurement objects, an SMTC that is fully overlapped with the measurement gap configuration, wherein the plurality of measurement objects are all measurement objects for which the UE is to measure feedback information using the measurement gap configuration.

The operation flow/algorithmic structure 200 may further include, at 212, encoding, for transmission to the UE, configuration information to indicate the SMTC for the plurality of measurement objects. For example, the configuration information may be included in a MeasObjectNR information element transmitted by the base station to the UE in control information.

In some embodiments, the base station may receive feedback information for the plurality of measurement objects and/or determine an estimated delay for receipt of the feedback information, as described herein.

Figure 3:
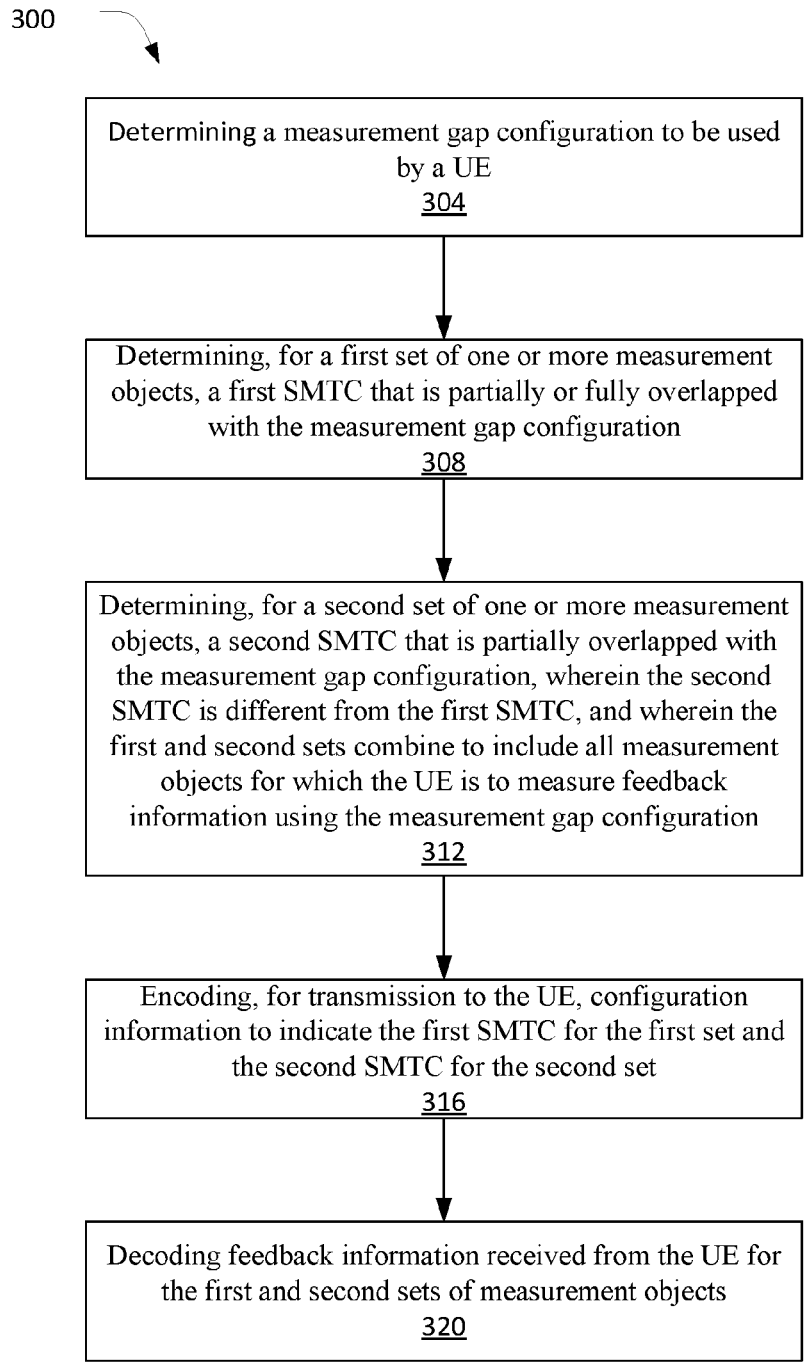
FIG. 3 illustrates an operation flow/algorithmic structure in accordance with some embodiments.

FIG. 3 illustrates an operation flow/algorithmic structure 300 in accordance with some embodiments. The operation flow/algorithmic structure 300 may be performed, in part or in whole, by the base station 108 or components thereof. For example, in some embodiments the operation flow/algorithmic structure 300 may be performed by the baseband circuitry implemented in the base station 108.

The operation flow/algorithmic structure 300 may include, at 304, determining a measurement gap configuration to be used by a UE.

The operation flow/algorithmic structure 300 may further include, at 308, determining, for a first set of one or more measurement objects, a first SMTC that is partially or fully overlapped with the measurement gap configuration.

The operation flow/algorithmic structure 300 may further include, at 312, determining, for a second set of one or more measurement objects, a second SMTC that is partially overlapped with the measurement gap configuration, wherein the second SMTC is different from the first SMTC, and wherein the first and second sets combine to include all measurement objects for which the UE is to measure feedback information using the measurement gap configuration.

The operation flow/algorithmic structure 300 may further include, at 316, encoding, for transmission to the UE, configuration information to indicate the first SMTC for the first set and the second SMTC for the second set.

The operation flow/algorithmic structure 300 may further include, at 320, decoding feedback information received from the UE for the first and second sets of measurement objects.

In some embodiments, the base station may receive feedback information for the plurality of measurement objects and/or determine an estimated delay for receipt of the feedback information, as described herein.

Figure 4:
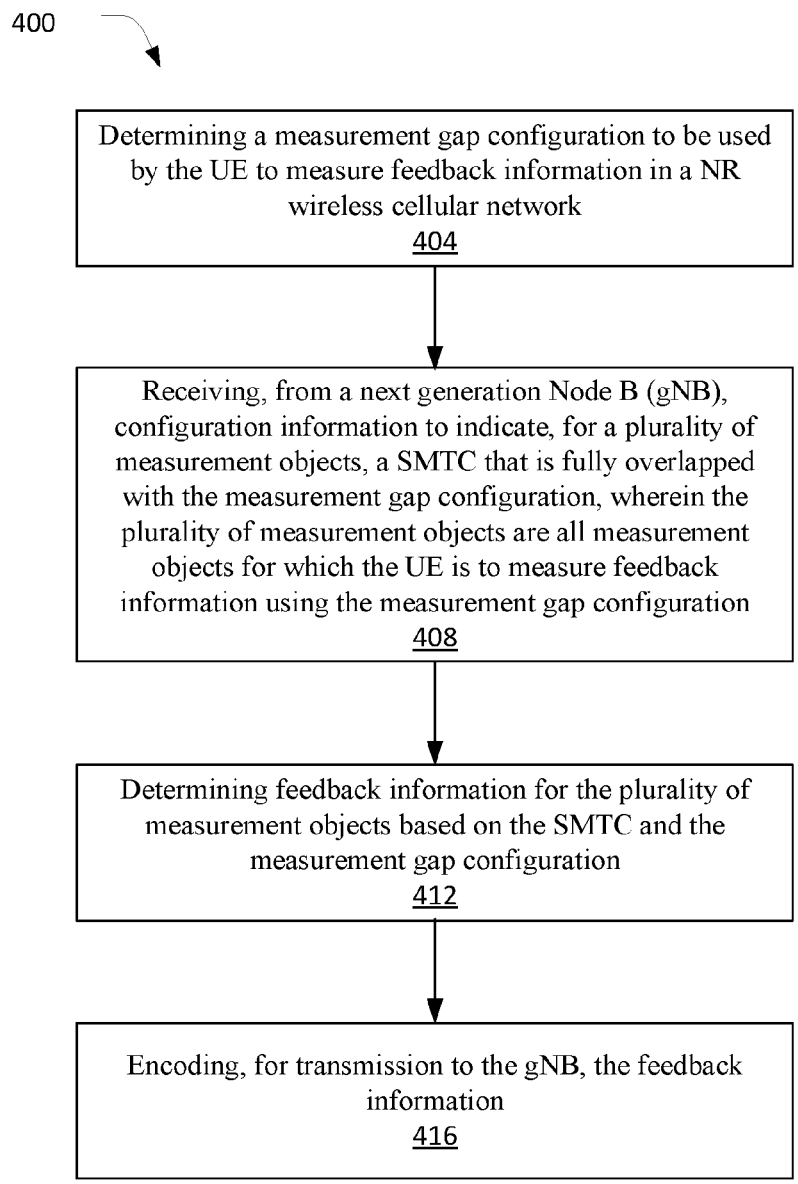
FIG. 4 illustrates an operation flow/algorithmic structure in accordance with some embodiments.

FIG. 4 illustrates an operation flow/algorithmic structure 400 in accordance with some embodiments. The operation flow/algorithmic structure 400 may be performed, in part or in whole, by the UE 104 or components thereof. For example, in some embodiments the operation flow/algorithmic structure 400 may be performed by the baseband circuitry implemented in the UE 104.

The operation flow/algorithmic structure 400 may include, at 404, determining a measurement gap configuration to be used by the UE to measure feedback information in a NR wireless cellular network.

The operation flow/algorithmic structure 400 may further include, at 408, receiving, from a next generation Node B (gNB), configuration information to indicate, for a plurality of measurement objects, a SMTC that is fully overlapped with the measurement gap configuration, wherein the plurality of measurement objects are all measurement objects for which the UE is to measure feedback information using the measurement gap configuration.

The operation flow/algorithmic structure 400 may further include, at 412, determining feedback information for the plurality of measurement objects based on the SMTC and the measurement gap configuration.

The operation flow/algorithmic structure 400 may further include, at 416, encoding, for transmission to the gNB, the feedback information.

Figure 5:
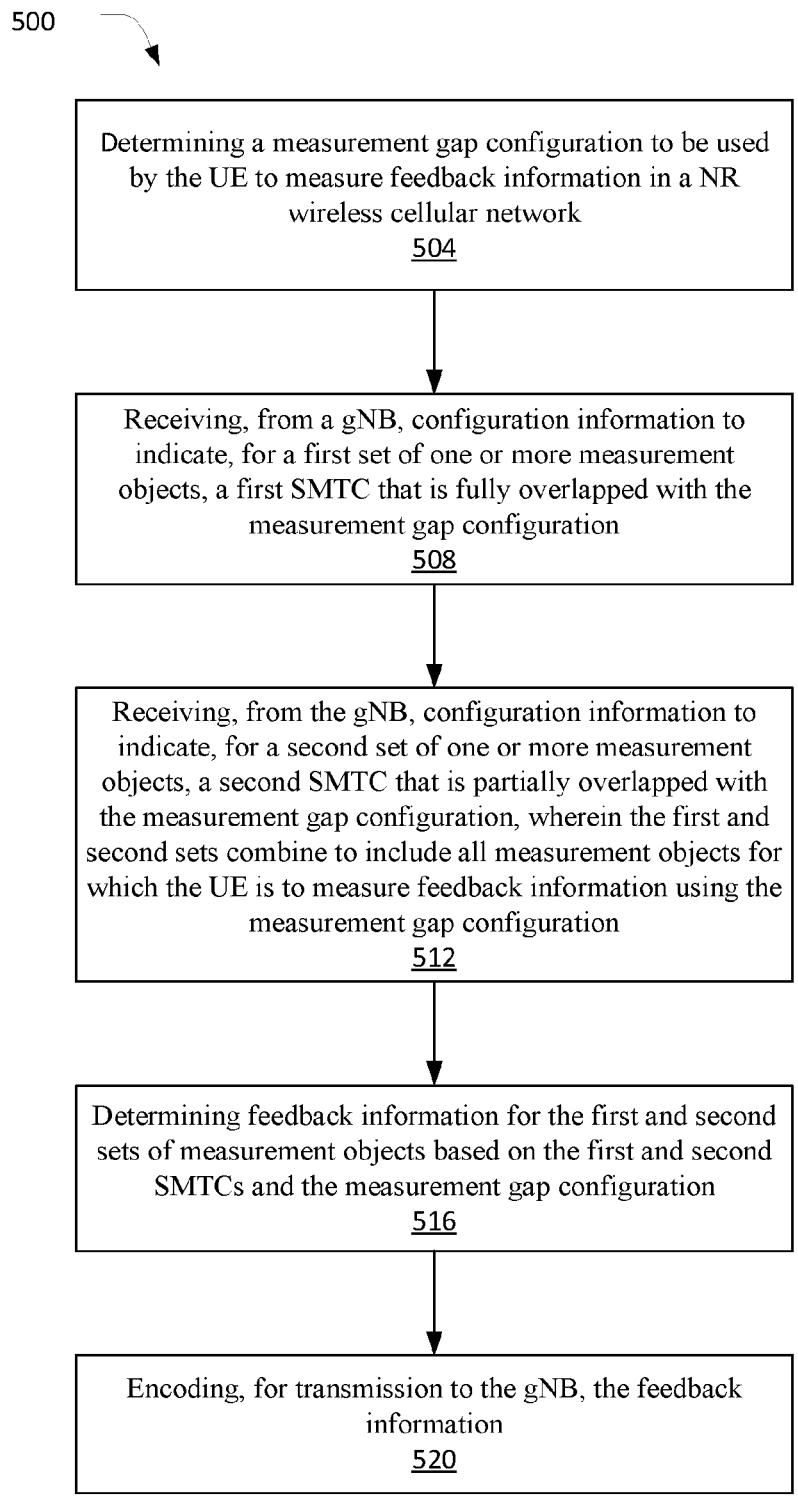
FIG. 5 illustrates an operation flow/algorithmic structure in accordance with some embodiments.

FIG. 5 illustrates another operation flow/algorithmic structure 500 in accordance with some embodiments. The operation flow/algorithmic structure 500 may be performed, in part or in whole, by the UE 104 or components thereof. For example, in some embodiments the operation flow/algorithmic structure 500 may be performed by the baseband circuitry implemented in the UE 104.

The operation flow/algorithmic structure 500 may include, at 504, determining a measurement gap configuration to be used by the UE to measure feedback information in a NR wireless cellular network.

The operation flow/algorithmic structure 500 may further include, at 508, receiving, from a gNB, configuration information to indicate, for a first set of one or more measurement objects, a first SMTC that is fully overlapped with the measurement gap configuration.

The operation flow/algorithmic structure 500 may further include, at 512, receiving, from the gNB, configuration information to indicate, for a second set of one or more measurement objects, a second SMTC that is partially overlapped with the measurement gap configuration, wherein the first and second sets combine to include all measurement objects for which the UE is to measure feedback information using the measurement gap configuration.

The operation flow/algorithmic structure 500 may further include, at 516, determining feedback information for the first and second sets of measurement objects based on the first and second SMTCs and the measurement gap configuration.

The operation flow/algorithmic structure 500 may further include, at 520, encoding, for transmission to the gNB, the feedback information.

Figure 6:
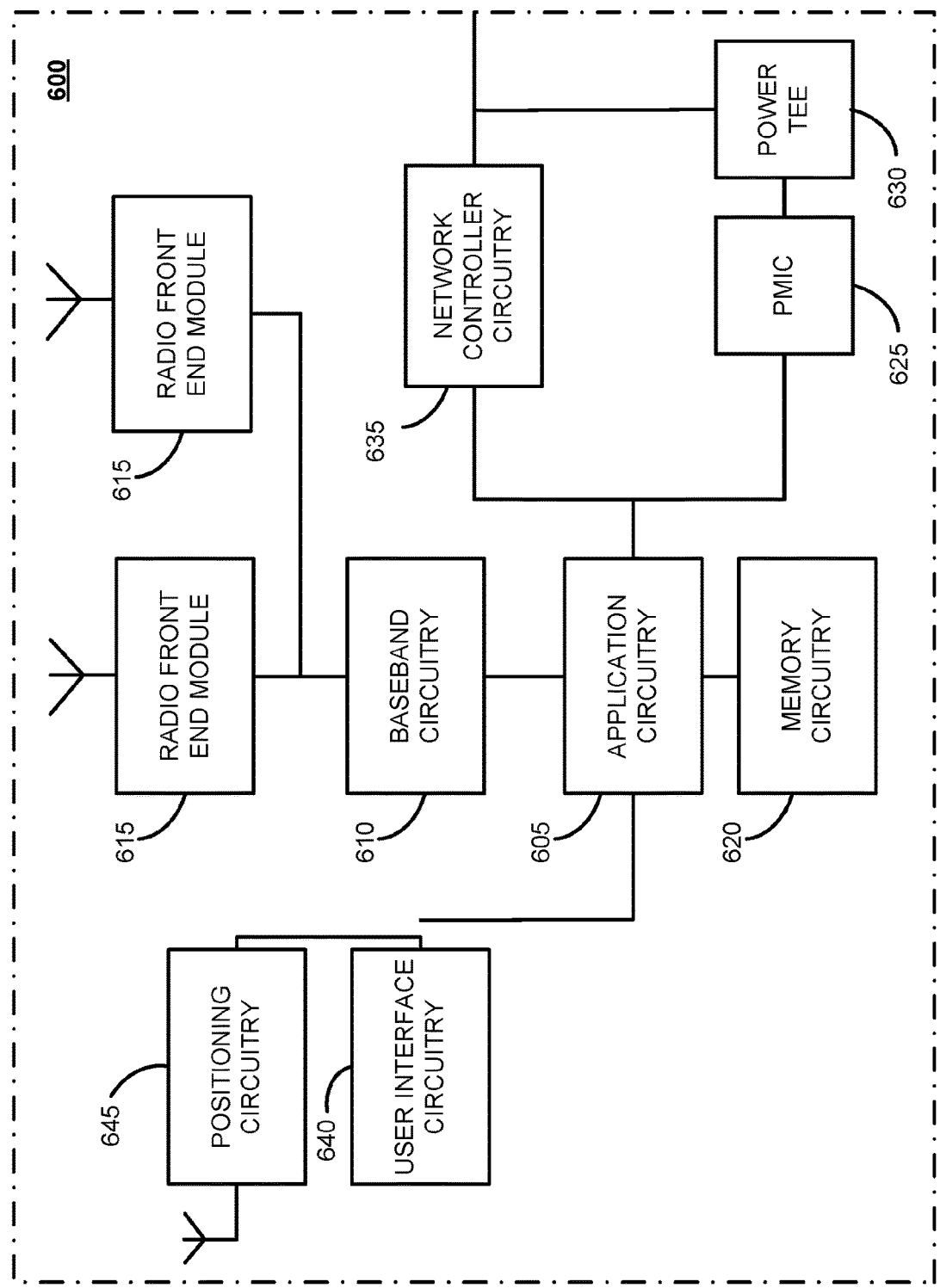
FIG. 6 illustrates an example of infrastructure equipment in accordance with various embodiments.

FIG. 6 illustrates an example of infrastructure equipment 600 in accordance with various embodiments. The infrastructure equipment 600 (or "system 600") may be implemented as a base station, radio head, RAN node, etc., such as base station 108 shown and described previously. The system 600 may include one or more of application circuitry 605, baseband circuitry 610, one or more radio front end modules 615, memory circuitry 620, power management integrated circuitry (PMIC) 625, power tee circuitry 630, network controller circuitry 635, network interface connector 640, satellite positioning circuitry 645, and user interface 650. In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for CRAN, vBBU, or other like implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality.

In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as, "processor circuitry." As used herein, the term "processor circuitry" may refer to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Application circuitry 605 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or TO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 605 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 600 may not utilize application circuitry 605, and instead may include a special-purpose processor/controller to process IP data received from an EPC or 5GC, for example.

Additionally or alternatively, application circuitry 605 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 605 may comprise logic blocks or logic fabric, and other interconnected resources that may be programmed to perform various functions, such as the procedures, methods, functions, etc. of the various embodiments discussed herein. In such embodiments, the circuitry of application circuitry 605 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. Although not shown, baseband circuitry 610 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 610 may include protocol processing circuitry with one or more instances of control circuitry (not shown) to provide control functions for the digital baseband circuitry and/or radio frequency circuitry (e.g., the radio front end modules 615).

User interface circuitry 650 may include one or more user interfaces designed to enable user interaction with the system 600 or peripheral component interfaces designed to enable peripheral component interaction with the system 600. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 615 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 615. The RFEMs 615 may incorporate both millimeter wave antennas and sub-millimeter wave antennas.

The memory circuitry 620 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 620 may be implemented as one or more of solder down packaged integrated circuits, socketed memory modules and plug-in memory cards.

The PMIC 625 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 630 may provide for electrical power drawn from a network cable to provide both power supply and data connectivity to the infrastructure equipment 600 using a single cable.

The network controller circuitry 635 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 600 via network interface connector 640 using a physical connection, which may be electrical (commonly referred to as a "copper interconnect"), optical, or wireless. The network controller circuitry 635 may include one or more dedicated processors and/or FPGAs to communicate using one or more of the aforementioned protocols. In some implementations, the network controller circuitry 635 may include multiple controllers to provide connectivity to other networks using the same or different protocols.

The positioning circuitry 645 may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 645 may comprise various hardware elements (e.g., including hardware devices such as switches, filters, amplifiers, antenna elements, and the like to facilitate OTA communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 645 and/or positioning circuitry implemented by UE 104, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 645 may include a Micro-Technology for Positioning, Navigation, and Timing (Micro-PNT) integrated circuit (IC) that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine time of flight (ToF) values for each received GNSS signal from the ToAs and the ToTs, and then may determine, from the ToFs, a three-dimensional (3D) position and clock deviation. The 3D position may then be converted into a latitude, longitude and altitude. The positioning circuitry 645 may provide data to application circuitry 605 that may include one or more of position data or time data. Application circuitry 605 may use the time data to synchronize operations with other radio base stations (e.g., base station 108 or the like).

The components shown by FIG. 6 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 7:
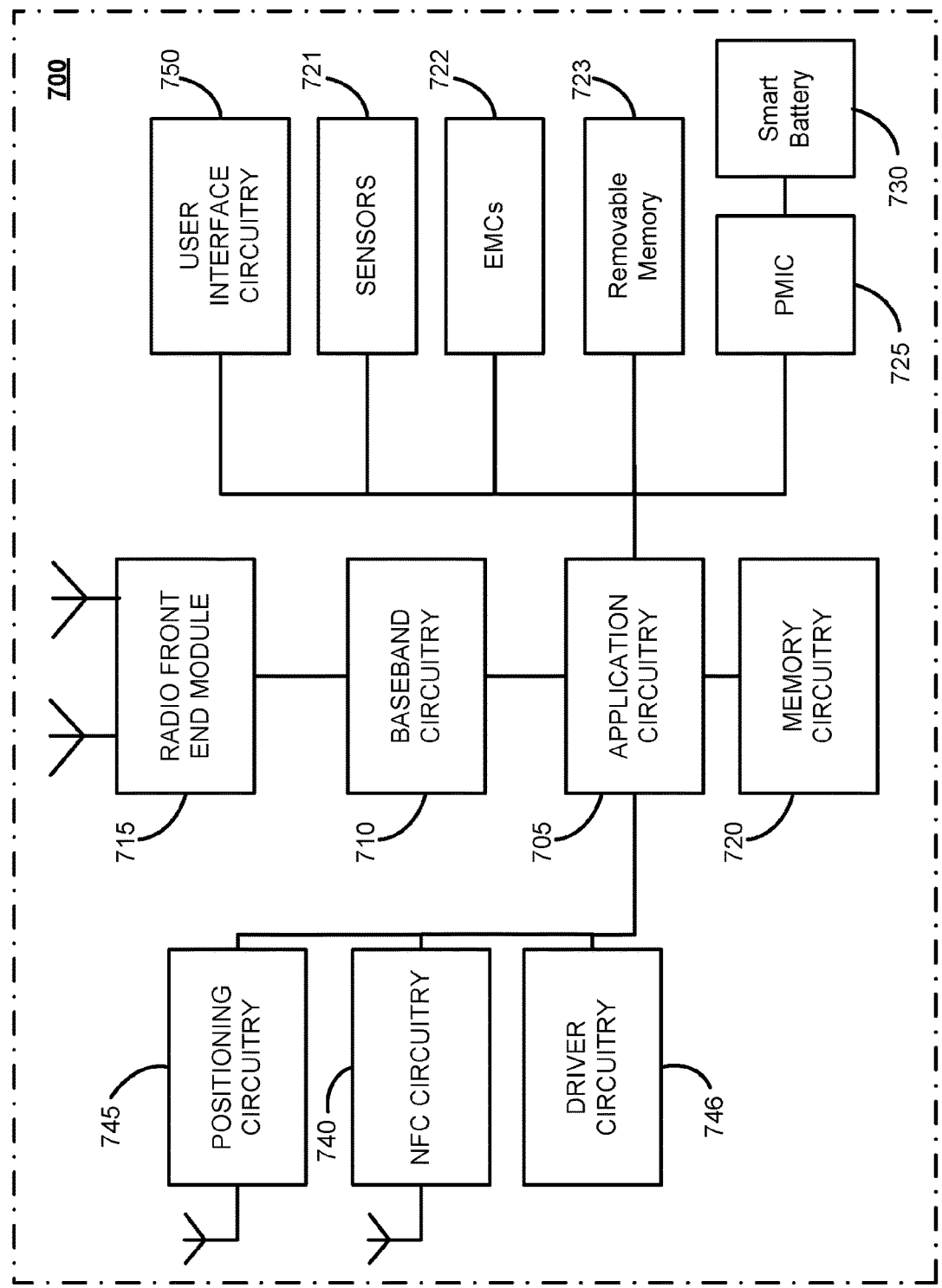
FIG. 7 depicts example components of a computer platform or device in accordance with various embodiments.

FIG. 7 illustrates an example of a platform 700 (or "device 700") in accordance with various embodiments. In embodiments, the computer platform 700 may be suitable for use as UE 104, base station 108, or any other element/device discussed herein. The platform 700 may include any combinations of the components shown in the example. The components of platform 700 may be implemented as integrated circuits (ICs), portions thereof, discrete electronic devices, or other modules, logic, hardware, software, firmware, or a combination thereof adapted in the computer platform 700, or as components otherwise incorporated within a chassis of a larger system. The block diagram of FIG. 7 is intended to show a high level view of components of the computer platform 700. However, some of the components shown may be omitted, additional components may be present, and different arrangement of the components shown may occur in other implementations.

The application circuitry 705 may include circuitry such as, but not limited to, single-core or multi-core processors and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input/output (IO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 700. In some embodiments, processors of application circuitry 605/705 may process IP data packets received from an EPC or 5GC.

Application circuitry 705 may be or include a microprocessor, a multi-core processor, a multithreaded processor, an ultra-low voltage processor, an embedded processor, or other known processing element. In one example, the application circuitry 705 may include an Intel® Architecture Core™ based processor, such as a Quark™, an Atom™, an i3, an i5, an i7, or an MCU-class processor, or another such processor available from Intel® Corporation, Santa Clara, CA The processors of the application circuitry 705 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc.; an ARM-based design licensed from ARM Holdings, Ltd.; or the like. In some implementations, the application circuitry 705 may be a part of a system on a chip (SoC) in which the application circuitry 705 and other components are formed into a single integrated circuit, or a single package, such as the Edison™ or Galileo™ SoC boards from Intel® Corporation.

Additionally or alternatively, application circuitry 705 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. Although not shown, baseband circuitry 710 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 710 may include protocol processing circuitry with one or more instances of control circuitry (not shown) to provide control functions for the digital baseband circuitry and/or radio frequency circuitry (e.g., the radio front end modules 715).

The radio front end modules (RFEMs) 715 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 715. The RFEMs 715 may incorporate both millimeter wave antennas and sub-millimeter wave antennas.

The memory circuitry 720 may include any number and type of memory devices used to provide for a given amount of system memory. As examples, the memory circuitry 720 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 720 may be developed in accordance with a Joint Electron Devices Engineering Council (JEDEC) low power double data rate (LPDDR)-based design, such as LPDDR2, LPDDR3, LPDDR4, or the like. Memory circuitry 720 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 720 may be on-die memory or registers associated with the application circuitry 705. To provide for persistent storage of information such as data, applications, operating systems and so forth, memory circuitry 720 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 700 may incorporate the three-dimensional (3D) cross-point (XPOINT) memories from Intel® and Micron®.

Removable memory circuitry 723 may include devices, circuitry, enclosures/housings, ports or receptacles, etc. used to couple portable data storage devices with the platform 700. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 700 may also include interface circuitry (not shown) that is used to connect external devices with the platform 700. The external devices connected to the platform 700 via the interface circuitry may include sensors 721, such as accelerometers, level sensors, flow sensors, temperature sensors, pressure sensors, barometric pressure sensors, and the like. The interface circuitry may be used to connect the platform 700 to electro-mechanical components (EMCs) 722, which may allow platform 700 to change its state, position, and/or orientation, or move or control a mechanism or system. The EMCs 722 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 700 may be configured to operate one or more EMCs 722 based on one or more captured events and/or instructions or control signals received from a service provider and/or various clients.

In some implementations, the interface circuitry may connect the platform 700 with positioning circuitry 745, which may be the same or similar as the positioning circuitry 645 discussed with regard to FIG. 6.

In some implementations, the interface circuitry may connect the platform 700 with Near-Field Communication (NFC) circuitry 740, which may include an NFC controller coupled with an antenna element and a processing device.

The NFC circuitry 740 may be configured to read electronic tags and/or connect with another NFC-enabled device.

The driver circuitry 746 may include software and hardware elements that operate to control particular devices that are embedded in the platform 700, attached to the platform 700, or otherwise communicatively coupled with the platform 700. The driver circuitry 746 may include individual drivers allowing other components of the platform 700 to interact with or control various input/output (I/O) devices that may be present within, or connected to, the platform 700. For example, driver circuitry 746 may include a display driver to control and allow access to a display device, a touchscreen driver to control and allow access to a touchscreen interface of the platform 700, sensor drivers to obtain sensor readings of sensors 721 and control and allow access to sensors 721, EMC drivers to obtain actuator positions of the EMCs 722 and/or control and allow access to the EMCs 722, a camera driver to control and allow access to an embedded image capture device, audio drivers to control and allow access to one or more audio devices.

The power management integrated circuitry (PMIC) 725 (also referred to as "power management circuitry 725") may manage power provided to various components of the platform 700. In particular, with respect to the baseband circuitry 710, the PMIC 725 may control power-source selection, voltage scaling, battery charging, or DC-to-DC conversion. The PMIC 725 may often be included when the platform 700 is capable of being powered by a battery 730, for example, when the device is included in the UE 104.

In some embodiments, the PMIC 725 may control, or otherwise be part of, various power saving mechanisms of the platform 700. For example, if the platform 700 is in an RRC_Connected state, where it is still connected to the RAN node as it expects to receive traffic shortly, then it may enter a state known as Discontinuous Reception Mode (DRX) after a period of inactivity. During this state, the platform 700 may power down for brief intervals of time and thus save power. If there is no data traffic activity for an extended period of time, then the platform 700 may transition off to an RRC_Idle state, where it disconnects from the network and does not perform operations such as channel quality feedback, handover, etc. The platform 700 goes into a very low power state and it performs paging where again it periodically wakes up to listen to the network and then powers down again. The platform 700 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 730 may power the platform 700, although in some examples the platform 700 may be mounted deployed in a fixed location, and may have a power supply coupled to an electrical grid. The battery 730 may be a lithium ion battery, a metal-air battery, such as a zinc-air battery, an aluminum-air battery, a lithium-air battery, and the like. In some implementations, such as in V2X applications, the battery 730 may be a typical lead-acid automotive battery.

In some implementations, the battery 730 may be a "smart battery," which includes or is coupled with a Battery Management System (BMS) or battery monitoring integrated circuitry. The BMS may be included in the platform 700 to track the state of charge (SoCh) of the battery 730. The BMS may be used to monitor other parameters of the battery 730 to provide failure predictions, such as the state of health (SoH) and the state of function (SoF) of the battery 730. The BMS may communicate the information of the battery 730 to the application circuitry 705 or other components of the platform 700. The BMS may also include an analog-to-digital (ADC) convertor that allows the application circuitry 705 to directly monitor the voltage of the battery 730 or the current flow from the battery 730. The battery parameters may be used to determine actions that the platform 700 may perform, such as transmission frequency, network operation, sensing frequency, and the like.

A power block, or other power supply coupled to an electrical grid may be coupled with the BMS to charge the battery 730. In some examples, a power block may be replaced with a wireless power receiver to obtain the power wirelessly, for example, through a loop antenna in the computer platform 700. In these examples, a wireless battery charging circuit may be included in the BMS. The specific charging circuits chosen may depend on the size of the battery 730, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 750 includes various input/output (I/O) devices present within, or connected to, the platform 700, and includes one or more user interfaces designed to enable user interaction with the platform 700 and/or peripheral component interfaces designed to enable peripheral component interaction with the platform 700. The user interface circuitry 750 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chyrstal Displays (LCD), LED displays, quantum dot displays, projectors, etc.), with the output of characters, graphics, multimedia objects, and the like being generated or produced from the operation of the platform 700. The output device circuitry may also include speakers or other audio emitting devices, printer(s), and/or the like. In some embodiments, the sensor circuitry 721 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc Although not shown, the components of platform 700 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, a FlexRay system, or any number of other technologies. The bus may be a proprietary bus, for example, used in a SoC based system. Other bus systems may be included, such as an I2C interface, an SPI interface, point-to-point interfaces, and a power bus, among others.

Figure 8:
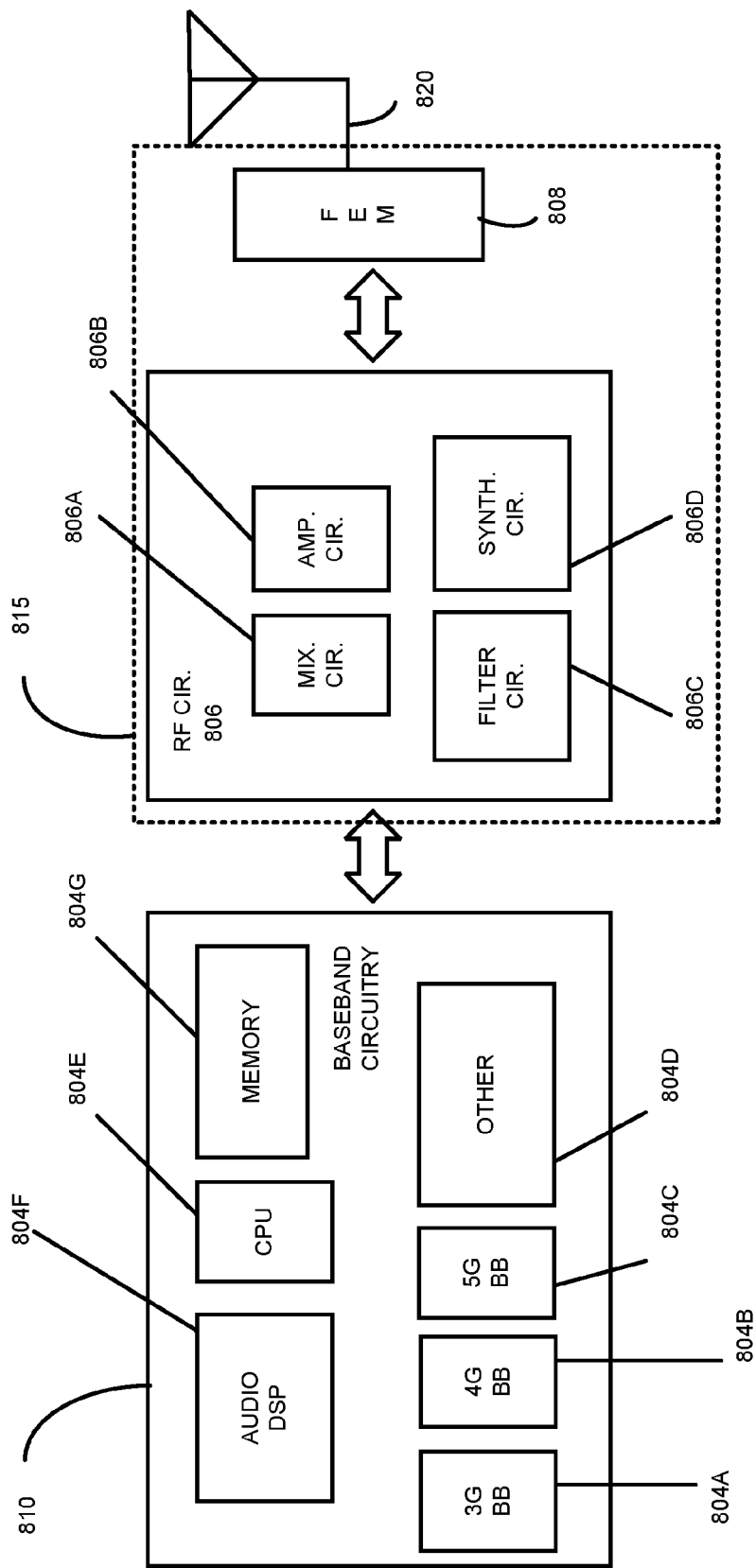
FIG. 8 depicts example components of baseband circuitry and radio frequency end modules in accordance with various embodiments.

FIG. 8 illustrates example components of baseband circuitry 610/710 and radio front end modules (RFEM) 615/715 in accordance with various embodiments. As shown, the RFEMs 615/715 may include Radio Frequency (RF) circuitry 806, front-end module (FEM) circuitry 808, one or more antennas 820 coupled together at least as shown.

The baseband circuitry 610/710 may include circuitry such as, but not limited to, one or more single-core or multi-core processors. The baseband circuitry 610/710 may include one or more baseband processors or control logic to process baseband signals received from a receive signal path of the RF circuitry 806 and to generate baseband signals for a transmit signal path of the RF circuitry 806. Baseband processing circuitry 610/710 may interface with the application circuitry 605/705 for generation and processing of the baseband signals and for controlling operations of the RF circuitry 806. For example, in some embodiments, the baseband circuitry 610/710 may include a third generation (3G) baseband processor 804A, a 4G baseband processor 804B, a 5G baseband processor 804C, or other baseband processor(s) 804D for other existing generations, generations in development or to be developed in the future (e.g., second generation (2G), sixth generation (6G), etc.). The baseband circuitry 610/710 (e.g., one or more of baseband processors 804A-D) may handle various radio control functions that enable communication with one or more radio networks via the RF circuitry 806. In other embodiments, some or all of the functionality of baseband processors 804A-D may be included in modules stored in the memory 804G and executed via a Central Processing Unit (CPU) 804E. The radio control functions may include, but are not limited to, signal modulation/demodulation, encoding/decoding, radio frequency shifting, etc. In some embodiments, modulation/demodulation circuitry of the baseband circuitry 610/710 may include Fast-Fourier Transform (FFT), precoding, or constellation mapping/demapping functionality. In some embodiments, encoding/decoding circuitry of the baseband circuitry 610/710 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 610/710 may include one or more audio digital signal processor(s) (DSP) 804F. The audio DSP(s) 804F may include elements for compression/decompression and echo cancellation and may include other suitable processing elements in other embodiments. Components of the baseband circuitry may be suitably combined in a single chip or a single chipset, or disposed on a same circuit board in some embodiments. In some embodiments, some or all of the constituent components of the baseband circuitry 610/710 and the application circuitry 605/705 may be implemented together such as, for example, on a system on a chip (SOC).

In some embodiments, the baseband circuitry 610/710 may provide for communication compatible with one or more radio technologies. For example, in some embodiments, the baseband circuitry 610/710 may support communication with an E-UTRAN or other WMAN, a WLAN, a WPAN. Embodiments in which the baseband circuitry 610/710 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path, which may include circuitry to down-convert RF signals received from the FEM circuitry 808 and provide baseband signals to the baseband circuitry 610/710. RF circuitry 806 may also include a transmit signal path, which may include circuitry to up-convert baseband signals provided by the baseband circuitry 610/710 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 610/710 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 610/710 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a of the transmit signal path may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 610/710 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 610/710 or the application circuitry 605/705 depending on the desired output frequency. In some embodiments, a divider control input (e.g., N) may be determined from a look-up table based on a channel indicated by the application circuitry 605/705.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path, which may include circuitry configured to operate on RF signals received from one or more antennas 820, amplify the received signals and provide the amplified versions of the received signals to the RF circuitry 806 for further processing. FEM circuitry 808 may also include a transmit signal path, which may include circuitry configured to amplify signals for transmission provided by the RF circuitry 806 for transmission by one or more of the one or more antennas 820. In various embodiments, the amplification through the transmit or receive signal paths may be done solely in the RF circuitry 806, solely in the FEM circuitry 808, or in both the RF circuitry 806 and the FEM circuitry 808.

In some embodiments, the FEM circuitry 808 may include a TX/RX switch to switch between transmit mode and receive mode operation. The FEM circuitry 808 may include a receive signal path and a transmit signal path. The receive signal path of the FEM circuitry 808 may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 820).

Processors of the application circuitry 605/705 and processors of the baseband circuitry 610/710 may be used to execute elements of one or more instances of a protocol stack. For example, processors of the baseband circuitry 610/710, alone or in combination, may be used execute Layer 3, Layer 2, or Layer 1 functionality, while processors of the application circuitry 605/705 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail herein.

Figure 9:
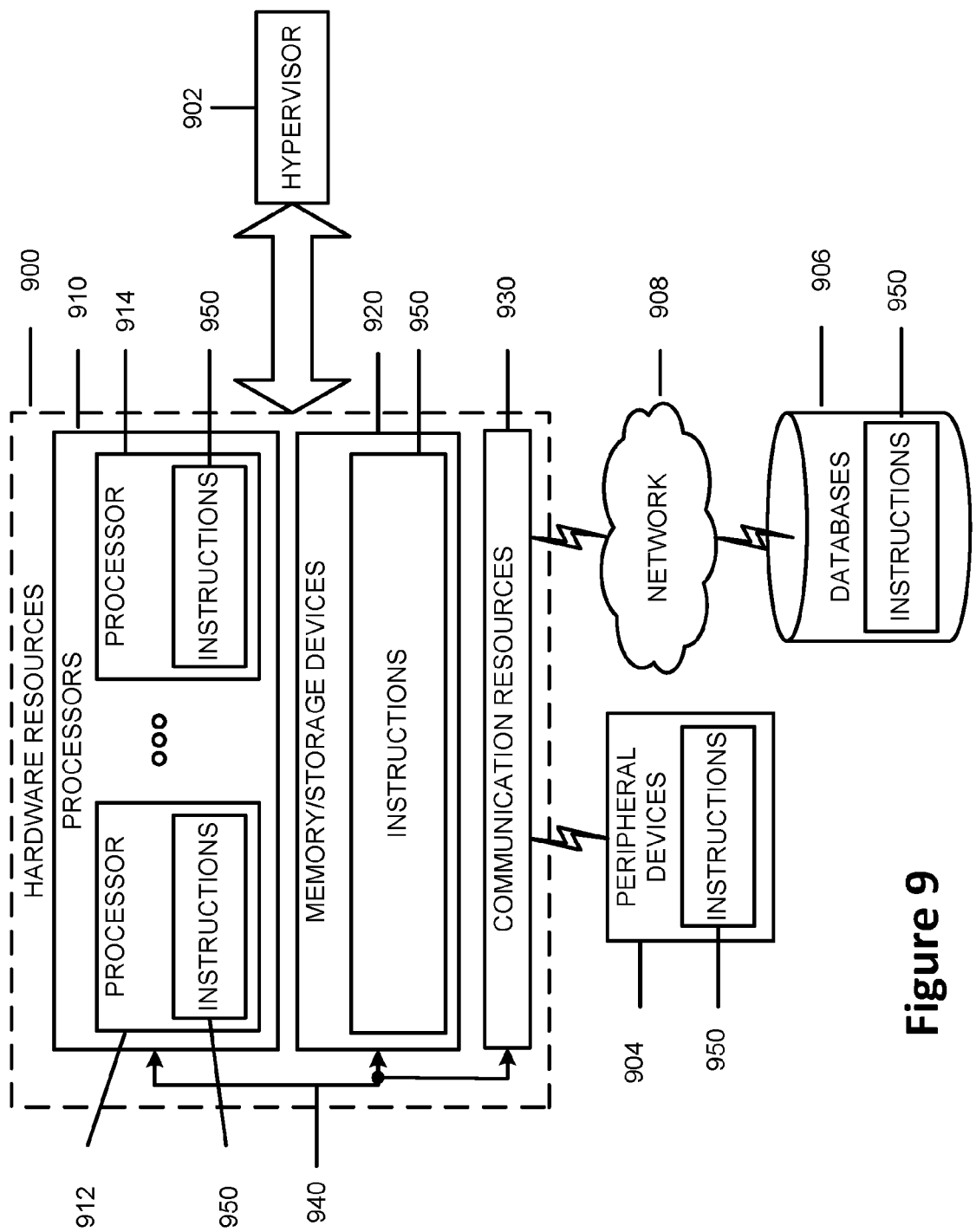
FIG. 9 is a block diagram illustrating components, according to some example embodiments, able to read instructions from a machine-readable or computer-readable medium (for example, a non-transitory machine-readable storage medium) and perform any one or more of the methodologies discussed herein.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. As used herein, the term "computing resource," "hardware resource," etc., may refer to a physical or virtual device, a physical or virtual component within a computing environment, and/or a physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 902 may be executed to provide an execution environment for one or more network slices/sub-slices to utilize the hardware resources 900. A "virtualized resource" may refer to compute, storage, and/or network resources provided by virtualization infrastructure to an application, device, system, etc.

The processors 910 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 914.

The memory/storage devices 920 may include main memory, disk storage, or any suitable combination thereof. The memory/storage devices 920 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 1030 may include wired communication components (e.g., for coupling via a universal serial bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Some non-limiting examples of various embodiments are provided below.

Example 1 is one or more transitory or non-transitory, computer-readable media having instructions, stored thereon, that when executed by one or more processors cause a next generation Node B (gNB) to: determine a measurement gap configuration to be used by a user equipment (UE); determine, for a plurality of measurement objects, a synchronization signal (SS)/physical broadcast channel (PBCH) block (SSB)-based measurement timing configuration (SMTC) that is fully overlapped with the measurement gap configuration, wherein the plurality of measurement objects are all measurement objects for which the UE is to measure feedback information using the measurement gap configuration; and encode, for transmission to the UE, configuration information to indicate the SMTC for the plurality of measurement objects.

Example 2 is the one or more media of Example 1, wherein the instructions, when executed, further cause the gNB to decode feedback information received from the UE for the plurality of measurement objects.

Example 3 is the one or more media of Example 2, wherein the feedback information includes one or more of a SSB-received signal received power (RSRP), a SSB-received signal received quality (RSRQ), or a SSB-signal to interference plus noise ratio (SINR).

Example 4 is the one or more media of Example 2, wherein the instructions, when executed, are further to cause the gNB to determine an expected delay for receipt of the feedback information based on a quantity of the measurement objects, the SMTC, and the measurement gap configuration.

Example 5 is the one or more media of Example 4, wherein the expected delay includes an identification delay to identify the respective measurement object and a measurement delay to measure the feedback information for the respective measurement object.

Example 6 is the one or more media of Example 5, wherein the identification delay is determined according to:

$$T_{Identify\_Inter\_perUEgap,group_i} =$$
$$K_{Inter-freq,GS} * \left( N_{FR1,i} \times M_{Identify_{Inter-freq,FR1}} \times \max(SMTC_i, MGRP) + N_{FR2,i} \times M_{Identify_{Inter-freq,FR2}} \times \max(SMTC_i, MGRP) \right)$$

wherein: $\tilde{T}_{Indentify\_Inter\_perUEgap,group_i}$ is the identification delay; $K_{Inter-freq,GS}$ is a scaling factor; $SMTC_i$ is an SMTC periodicity of the group of measurement objects; MGRP is a measurement gap repetition period of the measurement gap configuration; $N_{FR1,i}$ is a number inter-frequency new radio (NR) frequency range 1 (FR1) carriers in the plurality of measurement objects; $N_{FR2}$ is a number inter-frequency NR frequency range 2 (FR2) carriers in the plurality of measurement objects; $M_{Identify_{Inter}-freq,FR1}$ is a number of SMTC occasions that are used to identify a cell on one of the FR1 inter-frequency carriers; $M_{Identify_{Inter}-freq,FR2}$ is a number of SSBs that are used to identify a cell on one of the FR2 inter-frequency carriers.

Example 7 is the one or more media of Example 6, wherein the measurement delay is determined according to:

$$T_{Identify\_Inter\_perUEgap,group_i} =$$
$$K_{Inter-freq,GS} * \left( N_{FR1,i} \times M_{Identify_{Inter-freq,FR1}} \times \max(SMTC_i, MGRP) + N_{FR2,i} \times M_{Identify_{Inter-freq,FR2}} \times \max(SMTC_i, MGRP) \right)$$

wherein: $\tilde{T}_{measurement\_Inter\_perUEgap,group_i}$ is the measurement delay; $M_{measurement\_Inter-freq,\ FR1}$ is a number of SMTC occasions that are used to measure a cell on one of the FR1 inter-frequency carriers; and $M_{measurement\_Inter-freq,\ FR2}$ is a number of SSBs that are used to measure a cell on one of the FR2 inter-frequency carriers.

Example 8 is the one or more media of any of Examples 1-5, wherein the measurement gap configuration is a first measurement gap configuration designated for measurement objects in a new radio (NR) frequency range 1 (FR1), wherein the plurality of measurement objects are in the FR1 and are a first set of measurement objects, wherein the SMTC is a first SMTC, and wherein the instructions, when executed, further cause the gNB to: determine a second measurement gap configuration designated for measurement objects in a NR frequency range 2 (FR2); determine, for a second set of measurement objects in the FR2, a second SMTC that is fully overlapped with the second measurement gap configuration, wherein the second set of measurement objects includes all measurement objects for which the UE is to measure feedback information using the second measurement gap configuration; and encode, for transmission to the UE, configuration information to indicate the second SMTC for the second set of measurement objects.

Example 9 is the one or more media of Example 8, wherein the instructions, when executed, further cause the gNB to: determine a first expected delay for receipt of the feedback information for the first set of measurement objects based on a quantity of the measurement objects in the first set, the first SMTC, and the first measurement gap configuration; and determine a second expected delay for receipt of the feedback information for the second set of measurement objects based on a quantity of the measurement objects in the second set, the second SMTC, and the second measurement gap configuration.

Example 10 is the one or more media of any of Examples 1-9, wherein the SMTC is a first SMTC, and wherein the instructions, when executed, further cause the gNB to determine a second SMTC for one or more additional measurement objects, wherein the second SMTC is fully non-overlapped with the measurement gap configuration.

Example 11 is one or more transitory or non-transitory, computer-readable media having instructions, stored thereon, that when executed by one or more processors cause a next generation Node B (gNB) to: determine a measurement gap configuration to be used by a user equipment (UE); determine, for a first set of one or more measurement objects, a first synchronization signal (SS)/physical broadcast channel (PBCH) block (SSB)-based measurement timing configuration (SMTC) that is partially or fully overlapped with the measurement gap configuration; determine, for a second set of one or more measurement objects, a second SMTC that is partially overlapped with the measurement gap configuration, wherein the second SMTC is different from the first SMTC, and wherein the first and second sets combine to include all measurement objects for which the UE is to measure feedback information using the measurement gap configuration; encode, for transmission to the UE, configuration information to indicate the first SMTC for the first set and the second SMTC for the second set; and decode feedback information received from the UE for the first and second sets of measurement objects.

Example 12 is the one or more media of Example 11, wherein the first SMTC is fully overlapped with the measurement gap configuration.

Example 13 is the one or more media of Example 11 or 12, wherein the instructions, when executed, are further to cause the gNB to determine an expected delay for receipt of the feedback information for the respective first or second set based on a quantity of the measurement objects in the respective first or second sets, the respective first or second SMTC, and the measurement gap configuration.

Example 14 is the one or more media of any of Examples 11-13, wherein the instructions, when executed, are further to cause the gNB to determine an expected delay for receipt of the feedback information, wherein the expected delay is determined according to:

$$T_{Identify_{Inter_{per}}-UE-gap} =$$

$$K_{Inter-freq,GS} \times \left( \sum_{i=1}^{N_{freq,FR1}} \left(M_{Identify\_Inter-freq,FR1} \cdot \text{Max}(SMTC_i, MGRP)\right) + \right.$$

$$\left. \sum_{j=1}^{N_{freq,FR2}} \left(M_{Identify\_Inter-freq,FR2} \cdot \text{Max}(SMTC_j, MGRP)\right) \right) \text{ms; and}$$

$$T_{Measurement_{Inter_{per}}-UE-gap} =$$

$$K_{Inter-freq,GS} \times \left( \sum_{i=1}^{N_{freq,FR1}} \left(M_{Measurement\_Inter-freq,FR1} \cdot \text{Max}(SMTC_i, MGRP)\right) + \right.$$

$$\left. \sum_{j=1}^{N_{freq,FR2}} \left(M_{Measurement\_Inter-freq,FR2} \cdot \text{Max}(SMTC_j, MGRP)\right) \right) \text{ms}$$

wherein: $\tilde{T}_{Indentify\_Inter\_perUEgap}$ is an expected identification delay; $\tilde{T}_{measurement\_Inter\_perUEgap}$ is an expected measurement delay; $K_{Inter-freq,GS}$ is a scaling factor; $SMTC_i$ is an SMTC periodicity of the respective first or second set of measurement objects; MGRP is a measurement gap repetition period of the measurement gap configuration; $N_{FR1,i}$ is a number of inter-frequency new radio (NR) frequency range 1 (FR1) carriers in the respective first or second set of measurement objects; $N_{FR2}$ is a number of inter-frequency NR frequency range 2 (FR2) carriers in the respective first or second set of measurement objects; $M_{Identify_{Inter}-freq,FR1}$ is a number of SMTC occasions that are used to identify a cell on one of the FR1 inter-frequency carriers; $M_{Identify_{Inter}-freq,FR2}$ is a number of SSBs that are used to identify a cell on one of the FR2 inter-frequency carriers; $M_{measurement\_Inter-freq,\ FR1}$ is a number of SMTC occasions that are used to measure a cell on one of the FR1 inter-frequency carriers; and $M_{measurement\_Inter-freq,\ FR2}$ is a number of SSBs that are used to measure a cell on one of the FR2 inter-frequency carriers.

Example 15 is the one or more media of any of Examples 11-14, wherein the measurement gap configuration is a first measurement gap configuration designated for measurement objects in a new radio (NR) frequency range 1 (FR1), and wherein the instructions, when executed, further cause the gNB to: determine a second measurement gap configuration designated for measurement objects in a NR frequency range 2 (FR2); determine, for a third set of measurement objects in the FR2, a third SMTC that is fully or partially overlapped with the second measurement gap configuration; encode, for transmission to the UE, configuration information to indicate the third SMTC for the third set of measurement objects; determine a first expected delay for receipt of the feedback information for the first and second sets of measurement objects; and determine a second expected delay for receipt of feedback information for the third set of measurement objects.

Example 16 is the one or more media of Example 15, wherein the first expected delay is determined according to:

$$T_{Identify_{Inter_{per}}-FG,FR1} =$$

$$K_{Inter-freq,FR1,GS} \times \left( \sum_{i=1}^{N_{freq,FR1}} \left( M_{Inter-freq,FR1} \cdot \text{Max}(SMTC_i, MGRP) \right) \right) \text{ ms; and}$$

$$T_{measurement_{Inter_{per}}-FG,FR1} = K_{Inter-freq,FR1,GS} \times$$

$$\left( \sum_{i=1}^{N_{freq,FR1}} \left( M_{measurement\_Inter-freq,FR1} \cdot \text{Max}(SMTC_i, MGRP) \right) \right) \text{ ms}$$

wherein:

$$\tilde{T}_{Identify_{Inter_{per}}-FG,FR1}$$

is an expected identification delay;

$$\tilde{T}_{measurement_{Inter_{perFG}},FR2}$$

is an expected measurement delay; $K_{inter-freq,FR1,GS}$ is a scaling factor; $SMTC_i$ is an SMTC periodicity of the set of measurement objects; MGRP is a measurement gap repetition period of the measurement gap configuration; $N_{FR1,i}$ is a number of inter-frequency new radio (NR) frequency range 1 (FR1) carriers in the set of measurement objects; $N_{FR2}$ is a number of inter-frequency NR frequency range 2 (FR2) carriers in the set of measurement objects; $M_{Identify_{Inter}-freq,FR1}$ is a number of SMTC occasions that are used to identify a cell on one of the FR1 inter-frequency carriers; $M_{Identify_{Inter}-freq,FR2}$ is a number of SSBs that are used to identify a cell on one of the FR2 inter-frequency carriers; $M_{measurement\_Inter-freq, FR1}$ is a number of SMTC occasions that are used to measure a cell on one of the FR1 inter-frequency carriers; and $M_{measurement\_Inter-freq, FR2}$ is a number of SSBs that are used to measure a cell on one of the FR2 inter-frequency carriers.

Example 17 is the one or more media of any of Examples 11-13, wherein the instructions, when executed, further cause the gNB to determine an expected delay for receipt of the feedback information for the first set of measurement objects according to:

$$\tilde{T}_{Identify_{Inter_{PerUEgap}},group_i} =$$

$$K_{Inter-freq,GS} \times \big( M_{Identify_{Inter}-freq,FR1} \times (N_{FR1,i} \times \max(SMTC_i, MGRP) +$$

$$N_{FR1,partial} \times \max(SMTC_{i,partial}, MGRP)) + M_{Identify_{Inter}-freq,FR2} \times$$

$$(N_{FR2,i} \times \max(SMTC_i, MGRP) + N_{FR2,i,partial} \times \max(SMTC_{i,partial}, MGRP)) \big)$$

wherein:

$$\tilde{T}_{Identify_{Inter_{perUEgap}},group_i}$$

is an is expected identification delay for the measurement objects of the first set; $K_{Inter-freq,GS}$ is a scaling factor; $SMTC_i$ is an SMTC periodicity of the first SMTC; $SMTC_{i,partial}$ is an SMTC periodicity of the second SMTC; $N_{FR1,i}$ is a number inter-frequency NR FR1 carriers in the first set of measurement objects; $N_{FR2,i}$ is a number inter-frequency NR FR2 carriers in the second set of measurement objects; $N_{FR1,i,partial}$ is a number inter-frequency NR FR1 carriers in the second set of measurement objects; $N_{FR2,i,partial}$ is a number inter-frequency NR FR2 carriers in the second set of measurement objects; $M_{Identify\_Inter-freq, FR1}$ is a number of SMTC occasions which is used to identify a cell on a FR1 inter-frequency carrier; and $M_{Identify\_Inter-freq, FR2}$ is a number of SSBs which is used to identify a cell on a FR2 inter-frequency carrier.

Example 18 is one or more transitory or non-transitory, computer-readable media having instructions, stored thereon, that when executed by one or more processors cause a user equipment (UE) to: determine a measurement gap configuration to be used by the UE to measure feedback information in a new radio (NR) wireless cellular network; receive, from a next generation Node B (gNB), configuration information to indicate, for a plurality of measurement objects, a synchronization signal (SS)/physical broadcast channel (PBCH) block (SSB)-based measurement timing configuration (SMTC) that is fully overlapped with the measurement gap configuration, wherein the plurality of measurement objects are all measurement objects for which the UE is to measure feedback information using the measurement gap configuration; determine feedback information for the plurality of measurement objects based on the SMTC and the measurement gap configuration; and encode, for transmission to the gNB, the feedback information.

Example 19 is the one or more media of Example 18, wherein the instructions, when executed, are further to cause the UE to determine an expected delay to provide the feedback information to the gNB based on a quantity of the measurement objects, the SMTC, and the measurement gap configuration.

Example 20 is the one or more media of Example 19, wherein the expected delay is determined based on:

$$\tilde{T}_{Identify\_Inter\_perUEgap,group_i} =$$

$$K_{Inter-freq,GS} * \big( N_{FR1,i} \times M_{Identify_{Inter}-freq,FR1} \times \max(SMTC_i, MGRP) +$$

$$N_{FR2,i} \times M_{Identify_{Inter}-freq,FR2} \times \max(SMTC_i, MGRP) \big)$$

wherein: $\tilde{T}_{Indentify\_Inter\_perUEgap,group_i}$ is the identification delay; $K_{Inter-freq,GS}$ is a scaling factor; $SMTC_i$ is an SMTC periodicity of the group of measurement objects; MGRP is a measurement gap repetition period of the measurement gap configuration; $N_{FR1,i}$ is a number inter-frequency new radio (NR) frequency range 1 (FR1) carriers in the plurality of measurement objects; $N_{FR2}$ is a number inter-frequency NR frequency range 2 (FR2) carriers in the plurality of measurement objects; $M_{Identify_{Inter}-freq,FR1}$ is a number of SMTC occasions that are used to identify a cell on one of the FR1 inter-frequency carriers; $M_{Identify_{Inter}-freq,FR2}$ is a number of SSBs that are used to identify a cell on one of the FR2 inter-frequency carriers.

Example 21 is the one or more media of Example 20, wherein the measurement delay is determined further according to:

$$\tilde{T}_{measurement\_Inter\_perUEgap,group_i} =$$

$$K_{Inter-freq,GS} * \big( N_{FR1,i} \times M_{measurement\_Inter-freq,FR1} \times \max(SMTC_i, MGRP) +$$

$$N_{FR2,i} \times M_{measurement\_Inter-freq,FR2} \times \max(SMTC_i, MGRP) \big)$$

wherein: $\tilde{T}_{measurement\_Inter\_perUEgap,group_i}$ is the measurement delay; $M_{measurement\_Inter-freq, FR1}$ is a number of SMTC occasions that are used to measure a cell on one of the FR1 inter-frequency carriers; and $M_{measurement\_Inter-freq, FR2}$ is a number of SSBs that are used to measure a cell on one of the FR2 inter-frequency carriers.

Example 22 is one or more non-transitory, computer-readable media having instructions, stored thereon, that when executed by one or more processors cause a user equipment (UE) to: determine a measurement gap configuration to be used by the UE to measure feedback information in a new radio (NR) wireless cellular network; receive, from a next generation Node B (gNB), configuration information to indicate, for a first set of one or more measurement objects, a first synchronization signal (SS)/physical broadcast channel (PBCH) block (SSB)-based measurement timing configuration (SMTC) that is fully overlapped with the measurement gap configuration; receive, from the gNB, configuration information to indicate, for a second set of one or more measurement objects, a second SMTC that is partially overlapped with the measurement gap configuration, wherein the first and second sets combine to include all measurement objects for which the UE is to measure feedback information using the measurement gap configuration; determine feedback information for the first and second sets of measurement objects based on the first and second SMTCs and the measurement gap configuration; and encode, for transmission to the gNB, the feedback information.

Example 23 is the one or more media of Example 22, wherein the instructions, when executed, are further to cause the UE to determine an expected delay within which to provide the feedback information for the respective first or second set based on a quantity of the measurement objects in the respective first or second set, the respective first or second SMTCs, and the measurement gap configuration.

Example 24 is the one or more media of Example 23, wherein the expected delay is determined according to:

$$T_{Identify_{Inter_{per}} - UE-gap} =$$

$$K_{Inter-freq,GS} \times \left( \sum_{i=1}^{N_{freq,FR1}} \left( M_{Identify\_Inter-freq,FR1} \cdot \text{Max}(SMTC_i, MGRP) \right) + \right.$$

$$\left. \sum_{j=1}^{N_{freq,FR2}} \left( M_{Identify\_Inter-freq,FR2} \cdot \text{Max}(SMTC_j, MGRP) \right) \right) \text{ms; and}$$

$$T_{Identify_{Inter_{per}} - UE-gap} = K_{Inter-freq,GS} \times$$

$$\left( \sum_{i=1}^{N_{freq,FR1}} \left( M_{Measurement\_Inter-freq,FR1} \cdot \text{Max}(SMTC_i, MGRP) \right) + \right.$$

$$\left. \sum_{j=1}^{N_{freq,FR2}} \left( M_{Measurement\_Inter-freq,FR2} \cdot \text{Max}(SMTC_j, MGRP) \right) \right) \text{ms}$$

wherein: $\tilde{T}_{Indentify\_Inter\_perUEgap}$ is an expected identification delay; $\tilde{T}_{measurement\_Inter\_perUEgap}$ is an expected measurement delay; $K_{Inter-freq,GS}$ is a scaling factor; $SMTC_i$ is an SMTC periodicity of the respective first or second set of measurement objects; MGRP is a measurement gap repetition period of the measurement gap configuration; $N_{FR1,i}$ is a number of inter-frequency new radio (NR) frequency range 1 (FR1) carriers in the respective first or second set of measurement objects; $N_{FR2}$ is a number of inter-frequency NR frequency range 2 (FR2) carriers in the respective first or second set of measurement objects; $M_{Identify_{Inter}freq,FR1}$ is a number of SMTC occasions that are used to identify a cell on one of the FR1 inter-frequency carriers; $M_{Identify_{Inter}freq,FR2}$ is a number of SSBs that are used to identify a cell on one of the FR2 inter-frequency carriers; $M_{measurement\_Inter-freq, FR1}$ is a number of SMTC occasions that are used to measure a cell on one of the FR1 inter-frequency carriers; and $M_{measurement\_Inter-freq, FR2}$ is a number of SSBs that are used to measure a cell on one of the FR2 inter-frequency carriers.

Example 25 is the one or more media of Example 22 or 23, when executed, are further to cause the UE to determine an expected delay within which to provide the feedback information for the first set of measurement objects, wherein the expected delay is determined according to:

$$\tilde{T}_{Identify_{Inter_{perUEgap}},group_i} =$$

$$K_{Inter-freq,GS} \times \left( M_{Identify_{Inter}-freq,FR1} \times (N_{FR1,i} \times \max(SMTC_i, MGRP) + \right.$$

$$N_{FR1,partial} \times \max(SMTC_{i,partial}, MGRP)) + M_{Identify_{Inter}-freq,FR2} \times$$

$$\left. (N_{FR2,i} \times \max(SMTC_i, MGRP) + N_{FR2,i,partial} \times \max(SMTC_{i,partial}, MGRP)) \right)$$

wherein:

$$\tilde{T}_{Identify_{Inter_{perUEgap}},group_i}$$

is an is expected identification delay for the measurement objects of the first set; $K_{Inter-freq,GS}$ is a scaling factor; $SMTC_i$ is an SMTC periodicity of the first SMTC; $SMTC_{i,partial}$ is an SMTC periodicity of the second SMTC; $N_{FR1,i}$ is a number inter-frequency NR FR1 carriers in the first set of measurement objects; $N_{FR2,i}$ is a number inter-frequency NR FR2 carriers in the second set of measurement objects; $N_{FR1,i,partial}$ is a number inter-frequency NR FR1 carriers in the second set of measurement objects; $N_{FR2,i,partial}$ is a number inter-frequency NR FR2 carriers in the second set of measurement objects; $M_{Identify\_Inter-freq, FR1}$ is a number of SMTC occasions which is used to identify a cell on a FR1 inter-frequency carrier; and $M_{Identify\_Inter-freq, FR2}$ is a number of SSBs which is used to identify a cell on a FR2 inter-frequency carrier.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A non-transitory computer-readable medium having instructions, stored thereon, that when executed by one or more processors cause a user equipment (UE) to perform operations, the operations comprising:
   determining a measurement gap configuration to be used by the UE to measure feedback information in a wireless network;
   receiving from a base station, configuration information that indicates for a plurality of measurement objects, a synchronization signal (SS)/physical broadcast channel (PBCH) block (SSB)-based measurement timing configuration (SMTC) that is overlapped with the measurement gap configuration;

determining the feedback information for the plurality of measurement objects based on the SMTC and the measurement gap configuration;

determining an identification delay for identifying a measurement object of the plurality of measurement objects based at least on a number of inter-frequency new radio (NR) frequency range 1 (FR1) carriers of the plurality of measurement objects; and transmitting to the base station, the feedback information according to the identification delay.

2. The non-transitory computer-readable medium of claim 1, wherein the identification delay is based at least on a measurement gap repetition period (MGRP) of the measurement gap configuration.

3. The non-transitory computer-readable medium of claim 2, wherein the identification delay is determined according to:

$$T_{Identify\_Inter\_perUEgap, group_i} =$$
$$K_{Inter-freq,GS} * (N_{FR1,i} \times M_{Identify_{Inter-freq,FR1}} \times \max(SMTC_i, MGRP) +$$
$$N_{FR2,i} \times M_{Identify_{Inter-freq,FR2}} \times \max(SMTC_i, MGRP))$$

wherein:
$T_{Indentify\_Inter\_perUEgap, group_i}$ is the identification delay;
$=K_{Inter-freq,GS}$ is a scaling factor;
$SMTC_i$ is an SMTC periodicity of the plurality of measurement objects;
MGRP is the measurement gap repetition period of the measurement gap configuration;
$N_{FR1,i}$ is the number of inter-frequency NR FR1 carriers of the plurality of measurement objects;
$N_{FR2,i}$ is a number of inter-frequency NR frequency range 2 (FR2) carriers of the plurality of measurement objects;
$M_{IdentifyInter-freq,FR1}$ is a number of SMTC occasions that are used to identify a cell on one of the inter-frequency NR FR1 carriers; and
$M_{IdentifyInter-freq,FR2}$ is a number of SSBs that are used to identify a cell on one of the inter-frequency FR2 carriers.

4. The non-transitory computer-readable medium of claim 1, wherein the operations further comprise: determining an expected delay for receipt of the feedback information based on a quantity of the measurement objects, the SMTC, and the measurement gap configuration.

5. The non-transitory computer-readable medium of claim 4, wherein the expected delay comprises the identification delay and a measurement delay to measure the feedback information for the measurement object.

6. The non-transitory computer-readable medium of claim 5, wherein the measurement delay is based at least on a number of inter-frequency NR frequency range 2 (FR2) carriers of the plurality of measurement objects.

7. The non-transitory computer-readable medium of claim 6, wherein the measurement delay is determined according to:

$$T_{measurement\_Inter\_perUEgap, group_i} =$$
$$K_{Inter-freq,GS} * (N_{FR1,i} \times M_{measurement\_Inter-freq,FR1} \times \max(SMTC_i, MGRP) +$$
$$N_{FR2,i} \times M_{measurement\_Inter-freq,FR2} \times \max(SMTC_i, MGRP))$$

wherein:
$T_{Indentify\_Inter\_perUEgap, group_i}$ is the measurement delay;
$=K_{Inter-freq,GS}$ is a scaling factor;
MGRP is a measurement gap repetition period of the measurement gap configuration;
$N_{FR1,i}$ is the number of inter-frequency NR FR1 carriers of the plurality of measurement objects;
$N_{FR2,i}$ is the number of inter-frequency NR FR2 carriers of the plurality of measurement objects;
$M_{measurement\_Inter-freq,FR1}$ is the number of SMTC occasions that are used to measure a cell on one of the inter-frequency NR FR1 carriers; and
$M_{measurement\_Inter-freq,FR2}$ is a number of SSBs that are used to measure a cell on one of the FR2 inter-frequency carriers.

8. A method for a user equipment (UE), comprising:
determining a measurement gap configuration to be used by the UE to measure feedback information in a wireless network;

receiving from a base station, configuration information that indicates for a plurality of measurement objects, a synchronization signal (SS)/physical broadcast channel (Mal) block (SSB)-based measurement timing configuration (SMTC) that is overlapped with the measurement gap configuration;

determining the feedback information for the plurality of measurement objects based on the SMTC and the measurement gap configuration;

determining an identification delay for identifying a measurement object of the plurality of measurement objects based at least on a number of inter-frequency new radio (NR) frequency range 1 (FR1) carriers of the plurality of measurement objects; and transmitting to the base station, the feedback information according to the identification delay.

9. The method of claim 8, wherein the operations further comprise: determining an expected delay for receipt of the feedback information based on a quantity of the measurement objects, the SMTC, and the measurement gap configuration.

10. The method of claim 9, wherein the expected delay comprises the identification delay and a measurement delay to measure the feedback information for the measurement object.

11. The method of claim 10, wherein the identification delay is determined according to:

$$T_{Indentify\_Inter\_perUEgap, FR1} = K_{Inter-freq,GS} \times (N_{FR1} \times M_{Identify_{Inter-freq,FR1}} \times SMTC_{FR1})$$

wherein:
$T_{Indentify\_Inter\_perUEgap, group_i}$ is the identification delay;
$K_{inter-freq,GS}$ is scaling factor;
$SMTC_{FR1}$ is an SMTC periodicity of the plurality of measurement objects;
$N_{FR1}$ is the number of inter-frequency NR FR1 carriers of the plurality of measurement objects; and
$M_{IdentifyInter-freq,FR1}$ is a number of SMTC occasions that are used to identify a cell on one of the inter-frequency NR FR1 carriers.

12. The method of claim 10, wherein the measurement delay is based at least on a number of inter-frequency NR frequency range 2 (FR2) carriers of the plurality of measurement objects.

13. The method of claim 10, wherein the identification delay is based at least on a measurement gap repetition period (MGRP) of the measurement gap configuration.

14. The method of claim 13, wherein the identification delay is determined according to:

$$\tilde{T}_{Indentify\_Inter\_perUEgap,group_i} = K_{Inter-freq,GS}$$

$$*(N_{FR1,i} \times M_{IdentifyInter-freq,FR1} \times \max(SMTC_i, MGRP) + N_{FR2,i} \times M_{IdentifyInter-freq,FR2} \times \max(SMTC_i, MGRP))$$

wherein:

$\tilde{T}_{Indentify\_Inter\_perUEgap,group_i}$ is the identification delay;

$K_{inter-freq,GS}$ is scaling factor;

$SMTC_i$ is an SMTC periodicity of the plurality of measurement objects;

MGRP is the measurement gap repetition period of the measurement gap configuration;

$N_{FR1,i}$ is the number of inter-frequency NR FR1 carriers of the plurality of measurement objects;

$N_{FR2,i}$ is a number of inter-frequency NR frequency range 2 (FR2) carriers of the plurality of measurement objects;

$M_{IdentifyInter-freq,FR1}$ is a number of SMTC occasions that are used to identify a cell on one of the inter-frequency NR FR1 carriers; and $M_{identifyInter-freq,FR2}$ is a number of SSBs that are used to identify a cell on one of the inter-frequency FR2 carriers.

15. A user equipment (UE), comprising:
a transceiver; and
a processor communicatively coupled to the transceiver, configured to:
determine a measurement gap configuration to be used by the UE to measure feedback information in a wireless network;
receive from a base station, configuration information that indicates for a plurality of measurement objects, a synchronization signal (SS)/physical broadcast channel (PBCH) block (SSB)-based measurement timing configuration (SMTC) that is overlapped with the measurement gap configuration;
determine the feedback information for the plurality of measurement objects based on the SMTC and the measurement gap configuration;
determine an identification delay for identifying a measurement object of the plurality of measurement objects based at least on a number of inter-frequency new radio (NR) frequency range 2 (FR2) carriers of the plurality of measurement objects; and,
transmit to the base station, the feedback information according to the identification delay.

16. The UE of claim 15, wherein the processor is further configured to: determine an expected delay for receipt of the feedback information based on a quantity of the measurement objects, the SMTC, and the measurement gap configuration.

17. The of claim 16, wherein the expected delay comprises the identification delay and a measurement delay to measure the feedback information for the measurement object.

18. The UE of claim 17, wherein the measurement delay is based at least on a number of inter-frequency NR frequency range 2 (FR2) carriers of the plurality of measurement objects.

19. The LTE of claim 17, wherein the identification delay is determined according to:

$$\tilde{T}_{Indentify\_Inter\_perUEgap,FR2} = K_{Inter-freq,GS} \times (N_{FR2} \times M_{IdentifyInter-freq,FR2} \times SMTC_{FR2})$$

wherein:

$\tilde{T}_{Indentify\_Inter\_perUEgap,FR2}$ is the identification delay;

$K_{Inter-freq,GS}$ scaling factor, $SMTC_{FR2}$ is an SMTC periodicity of the plurality of measurement objects;

$N_{FR2}$ is the number of inter-frequency NR FR2 carriers of the plurality of measurement objects; and $M_{IdentifyInter-freq,FR2}$ is a number of SMTC occasions that are used to identify a cell on one of the inter-frequency NR FR2 carriers.

20. The UE of claim 15, wherein the identification delay is based at least on a measurement gap repetition period (MGRP) of the measurement gap configuration.

* * * * *